(12) United States Patent
Hattori et al.

(10) Patent No.: US 9,707,943 B2
(45) Date of Patent: Jul. 18, 2017

(54) BRAKE CONTROL DEVICE

(71) Applicant: TOYOTA JIDOSHA KABUSHIKI KAISHA, Toyota-shi, Aichi (JP)

(72) Inventors: Tsutomu Hattori, Susono (JP); Hiroshi Onuma, Susono (JP); Akira Nagae, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/910,788

(22) PCT Filed: Aug. 29, 2014

(86) PCT No.: PCT/JP2014/073410
§ 371 (c)(1),
(2) Date: Feb. 8, 2016

(87) PCT Pub. No.: WO2015/030263
PCT Pub. Date: Mar. 5, 2015

(65) Prior Publication Data
US 2016/0185328 A1 Jun. 30, 2016

(30) Foreign Application Priority Data
Aug. 30, 2013 (JP) .................................. 2013-179915

(51) Int. Cl.
*B60T 8/1755* (2006.01)

(52) U.S. Cl.
CPC ..... *B60T 8/17558* (2013.01); *B60T 2201/024* (2013.01); *B60T 2270/403* (2013.01)

(58) Field of Classification Search
CPC .......... B60T 8/17558; B60T 2201/024; B60T 2270/403
(Continued)

(56) References Cited

U.S. PATENT DOCUMENTS 8,191,667 B2 * 6/2012 Stabrey .................... B60T 7/22
180/274
2010/0300794 A1 12/2010 Stabrey
(Continued)

FOREIGN PATENT DOCUMENTS

CN    101678820 A    3/2010
CN    101932484 A   12/2010
(Continued)

OTHER PUBLICATIONS

International Search Report of PCT/JP2014/073410 dated Nov. 18, 2014 [PCT/ISA/210].
(Continued)

*Primary Examiner* — Yazan Soofi
(74) *Attorney, Agent, or Firm* — Sughrue Mion, PLLC

(57) ABSTRACT

A brake control device includes: a brake force generator of each wheel configured to generate a brake force according to a brake fluid pressure supplied from a fluid pressure channel; a pressurizer configured to pressurize a brake fluid and send the pressurized brake fluid to the fluid pressure channel; and a brake controller configured to reduce a pressurizing amount of the brake fluid pressure supplied to the fluid pressure channel or reduce the pressurizing amount to 0 before the collision of the own vehicle in a state where the possibility of collision of the own vehicle has been detected or after the collision, when the pressurizer has pressurized the brake fluid by the detection of the possibility of the collision and the pressurized brake fluid pressure has been supplied to the fluid pressure channel.

17 Claims, 14 Drawing Sheets

(58) Field of Classification Search
USPC ........................................................ 701/70
See application file for complete search history.

(56) References Cited

U.S. PATENT DOCUMENTS

2011/0004385 A1    1/2011  Ishimoto
2016/0185328 A1*   6/2016  Hattori ................ B60T 8/17558
                                                    701/70

FOREIGN PATENT DOCUMENTS

EP       2 266 851 A1    12/2010
JP         06-312654 A   11/1994
JP       2012-001091 A    1/2012

OTHER PUBLICATIONS

Written Opinion of PCT/JP2014/073410 dated Nov. 18, 2014 [PCT/ISA/237].

* cited by examiner

BRAKE CONTROL DEVICE

CROSS REFERENCE TO RELATED APPLICATIONS

This application is a National Stage of International Application No. PCT/JP2014/073410, filed Aug. 29, 2014, claiming priority based on Japanese Patent Application No. 2013-179915, filed Aug. 30, 2013, the contents of all of which are incorporated herein by reference in their entirety.

TECHNICAL FIELD

The invention relates to a brake control device for controlling a brake force generated by a vehicle.

BACKGROUND ART

Conventionally, various modes have been known as this type of the brake control device. The brake control device includes, for example, a controller configured such that when a fear of a collision of a driver's own vehicle is detected, a brake actuator of a brake system is pressurized and a brake force is automatically generated to thereby carry out a collision avoidance control (a so-called pre-collision brake control). Patent Literature 1 described below discloses the brake control device. When the brake control device predicts a risk of collision, the controller outputs a close signal to a reducing valve and outputs a duty signal to a compressing valve to thereby carry out a pre-collision brake control, and when the risk of collision is eliminated, the close signal is output to the compressing valve and outputs the duty signal to the reducing valve to thereby stop the pre-collision brake control. Further, there has been known a brake control device configured such that when a collision of the driver's own vehicle is detected, the driver's own vehicle is guided to a stop state by automatically generating a brake force by a pressurization control. Patent Literature 2 shown below discloses the brake control device. When a collision is detected, the brake control device automatically controls a time during which a brake force is generated based on a vehicle speed detected after the detection.

CITATION LIST

Patent Literature

Patent Literature 1: Japanese Patent Application Laid-open No. 6-312654
Patent Literature 2: Japanese Patent Application Laid-open No. 2012-001091

DISCLOSURE OF INVENTION

Problems to be Solved by the Invention

Incidentally, in a brake system, a collision of a driver's own vehicle may damage a fluid pressure channel of a brake fluid. At the time, it is desired to detect an abnormal reduction of brake fluid pressure and to specify a damaged portion at an early stage. However, when a damage occurs downstream (a wheel side) of a brake actuator during a pressurization control, since the brake fluid pressure is continuously pressurized also in the damaged portion, the brake fluid pressure is gently reduced in the damaged portion. Thus, there is a possibility that timing at which the abnormal reduction of the brake fluid pressure is detected is delayed.

An object of the invention is to provide a brake control device capable of detecting abnormality of a fluid pressure channel of a brake fluid at an early stage by improving a disadvantage of the conventional examples.

Solution to the Problems

A brake control device according to the present invention includes a brake force generator of each wheel configured to generate a brake force according to a brake fluid pressure supplied from a fluid pressure channel; a pressurizer configured to pressurize a brake fluid and send the pressurized brake fluid to the fluid pressure channel; a collision possibility determining unit configured to determine a possibility of collision of an own vehicle; a collision determining unit configured to detect the collision of the own vehicle; an abnormality detecting unit configured to detect abnormality of the fluid pressure channel at the time the brake fluid pressure of the fluid pressure channel has become equal to or smaller than a threshold value; and a brake controller configured to reduce a pressurizing amount of the brake fluid pressure supplied to the fluid pressure channel or reduce the pressurizing amount to 0 before the collision of the own vehicle in a state where the possibility of collision of the own vehicle has been detected or after the collision, when the pressurizer has pressurized the brake fluid by the detection of the possibility of the collision and the pressurized brake fluid pressure has been supplied to the fluid pressure channel.

In the brake control device, it is preferable that the brake controller starts a reduction control of the pressurizing amount of the brake fluid pressure, which is carried out before the collision of the own vehicle in the state where the possibility of collision of the own vehicle has been detected, at the time the collision possibility determining unit has determined that avoidance of the collision of the own vehicle is impossible.

In the brake control device, it is preferable that the brake controller starts the reduction control of the pressurizing amount of the brake fluid pressure, which is carried out after the collision of the own vehicle, at the time the collision determining unit has detected the collision of the own vehicle.

In the brake control device, it is preferable that at the time the brake controller carries out the reduction control of the pressurizing amount of the brake fluid pressure, the brake controller controls the pressurizer and reduces the pressurizing amount of the brake fluid pressure in the pressurizer or reduces the pressurizing amount to 0.

In the brake control device, it is preferable that at the time the brake controller carries out the reduction control of the pressurizing amount of the brake fluid pressure, the brake controller controls a valve mechanism interposed between the pressurizer and the brake force generator to a valve closing side or closes the valve mechanism.

In the brake control device, it is preferable to further includes a holding valve of each wheel for supplying the brake fluid pressure pressurized in the pressurizer at a time of a valve open state to the brake force generator, as the valve mechanism; and a reducing valve for reducing the brake fluid pressure supplied to the brake force generator at the time of the valve open state, as the valve mechanism, and it is preferable that when the brake controller carries out the reduction control of the pressurizing amount of the brake fluid pressure, the brake controller controls the holding valves and the reducing valves of all the wheels to the valve closing side or closes the holding valves and the reducing valves of all the wheels.

In the brake control device, it is preferable that at the time the brake controller has carried out the reduction control of the pressurizing amount of the brake fluid pressure after the collision of the own vehicle, the brake controller pressurizes the brake fluid pressure of a fluid pressure channel from which no abnormality has detected according to a result of detection of the abnormality detecting unit and causes the brake force generator that connects to the fluid pressure channel to generate a brake force according to the pressurized brake fluid pressure.

Effects of the Invention

The brake control device according to the invention is configured such that when the brake fluid leaks from the fluid pressure channel downstream side of the pressurizer by the collision of the driver's own vehicle, the brake fluid pressure of the fluid pressure channel where the leakage occurs can be promptly reduced to the threshold value of the abnormality detecting unit by suppressing the pressurizing amount of the brake fluid pressure supplied to the fluid pressure channel before or after of the collision of the driver's own vehicle. As a result, in the brake control device, the abnormality detecting unit can detect the abnormality of the fluid pressure channel at an early stage.

DESCRIPTION OF EMBODIMENTS

Embodiments of a brake control device according to the invention will be explained below in detail based on the drawings. The invention is by no means limited by the embodiments.

Embodiment

An embodiment of the brake control device according to the invention will be explained based on FIG. 1 to FIG. 5.

Figure 1:
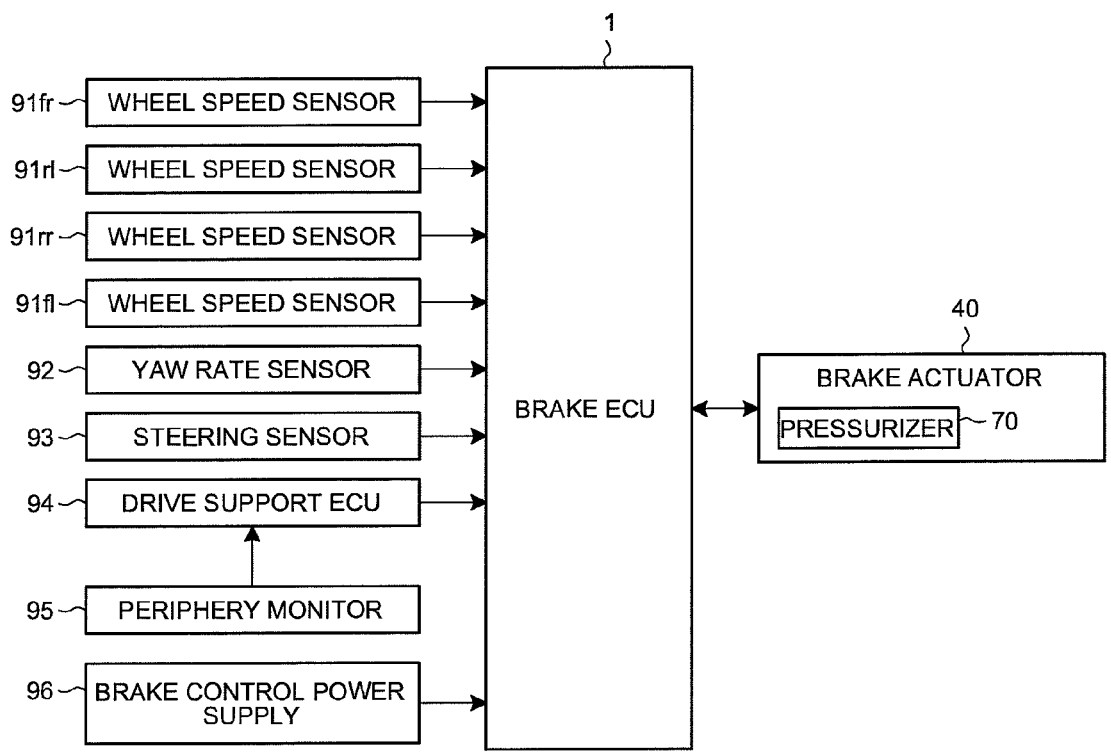
FIG. 1 is a view illustrating a configuration of a brake control device according to the invention.

A brake control device of the embodiment carries out a control to a brake system of a driver's own vehicle and includes an electronic control unit (hereinafter, called "brake ECU") 1 for executing arithmetic processing according to the control (FIG. 1).

The brake ECU 1 is connected with a fluid pressure adjuster (a brake actuator) 40 of the brake system be described later. The brake ECU 1 is connected with a wheel speed sensor 91 for each wheel in order to detect a wheel speed, and a detection signal of the wheel speed of each wheel** is sent. The brake ECU 1 calculates a vehicle speed of the driver's own vehicle based on the wheel speed.

The symbol "**" is a suffix corresponding to each wheel and illustrates any of "fr", "rl", "rr", or "fl". The suffixes "fr", "rl", "rr", and "fl" show a front right wheel, a rear left wheel, a rear right wheel, and a front left wheel, respectively.

The brake ECU 1 is connected with a yaw rate sensor 92 and a steering sensor 93. The yaw rate sensor 92 detects a yaw rate of the driver's own vehicle and sends the detected signal to the brake ECU 1. The steering sensor 93 detects a steering angle of a steering wheel (illustration omitted) according to a steering operation of a driver and sends the detected signal to the brake ECU 1. The brake ECU 1 can determine a turning state (a turning attitude) of the driver's own vehicle based on the detected signals of the yaw rate sensor 92 and the steering sensor 93.

The brake ECU 1 is connected with an electronic control unit (hereinafter, called "drive support ECU") 94 for carrying out arithmetic processing according to a drive support control of the driver's own vehicle. The drive support ECU 94 includes a drive support control unit for calculating a control mode to the brake system of the driver's own vehicle according to drive support contents. For example, the drive support control unit carries out arithmetic processing according to a drive support control (for example, a brake support control and a pre-collision brake control to be described later) for avoiding a collision of the driver's own vehicle. The drive support control unit carries out arithmetic processing according to a drive support control (for example, a stop control and a maneuvering stability improving control of the driver's own vehicle) when the driver's own vehicle has collided. The drive support ECU 94 is connected with a periphery monitor 95 for detecting a possibility of collision of the driver's own vehicle. The periphery monitor 95 is used to detect an obstacle (real estate, etc. that are unmovable and other vehicle, etc. that are movable) existing in a periphery of the driver's own vehicle and a milliwave radar sensor and is an image pick-up device such as a stereoscopic camera, for example. The periphery monitor 95 is disposed to, for example, a front portion and a side portion of the driver's own vehicle. When a rear side of the driver's own vehicle is monitored, the periphery monitor 95 may be disposed to a rear portion of the driver's own vehicle.

The brake ECU 1 is connected with a brake control power supply 96. The brake control power supply 96 is used as an auxiliary power supply for a brake control when a voltage of a secondary battery is reduced.

First, a configuration of the brake system exemplified here will be explained based on FIG. 2. The brake system is an example of a system mounted on a vehicle using an engine (an internal combustion engine, etc.) as a power source.

The brake system is a so-called disk brake device and can individually apply a brake force according to master cylinder pressure or brake fluid pressure, which has been adjusted, to each wheel. The brake system is disposed with a fluid pressure generator 20 for generating brake fluid pressure (master cylinder pressure) according to an operation amount (hereinafter, called "brake operation amount") of a brake pedal 10 of the driver, a brake force generator 30 of each wheel for generating the brake force according to the brake fluid pressure, and a fluid pressure adjuster 40 for supplying the brake fluid pressure of the fluid pressure generator 20 to each brake force generator 30 as it is or after adjusting the pressure to each wheel**. The brake operation amount (a pedal depression amount and a pedal depression force, etc.) is detected by a pedal sensor 11 and the detected signal is sent to the brake ECU 1.

The fluid pressure generator 20 includes a brake booster (a brake boosting device) 21, a master cylinder 22, and a reservoir tank 23. The master cylinder 22 generates the master cylinder pressure according to the pedal depression force (a sum of the pedal depression force of the driver and an assist force of the brake booster 21) in two fluid pressure chambers therein. A first fluid pressure path 24A and a second fluid pressure path 24B are caused to individually communicate with the respective fluid pressure chambers. Thus, the first fluid pressure path 24A and the second fluid pressure path 24B are supplied with the master cylinder pressure. The exemplified first fluid pressure path 24A is connected with a master cylinder pressure sensor 26 for detecting the master cylinder pressure. An output signal of the master cylinder pressure sensor 26 is sent to the brake ECU 1. The master cylinder pressure sensor 26 may be connected to the second fluid pressure path 24B.

The first fluid pressure path 24A and the second fluid pressure path 24B are connected to the fluid pressure adjuster 40 and supply the master cylinder pressure to the fluid pressure adjuster 40. The fluid pressure adjuster 40 is a so-called brake actuator and supplies the master cylinder pressure or the brake fluid pressure having been adjusted to the brake force generator 30 of a supply target via a fluid pressure path 31. A fluid pressure sensor 32 is disposed on the fluid pressure path 31 to each wheel. The fluid pressure sensor 32 detects the brake fluid pressure supplied to the brake force generator 30** and sends the detected signal to the brake ECU 1.

An operation of the fluid pressure adjuster 40 is controlled by the brake controller of the brake ECU 1. The fluid pressure adjuster 40 is exemplified as a so-called X-pipe including a first fluid pressure circuit for transmitting the brake fluid pressure to a front right wheel and a rear left wheel and a second fluid pressure circuit for transmitting the brake fluid pressure to a front left wheel and a rear right wheel. In the fluid pressure adjuster 40, the first fluid pressure path 24A is connected to the first fluid pressure circuit and the second fluid pressure path 24B is connected to the second fluid pressure circuit.

Specifically, the fluid pressure adjuster 40 includes two master cut valves 41A, 41B. The master cut valve 41A acts as a flow rate adjuster of a brake fluid in the first fluid pressure circuit and connected with the first fluid pressure path 24A. The master cut valve 41B acts as a flow rate adjuster of a brake fluid in the second fluid pressure circuit and connected with the second fluid pressure path 24B. The master cut valves 41A, 41B are so-called normally-open flow rate adjusting electromagnetic valves and a valve opening degree can be changed under the control of the brake controller. The respective master cut valves 41A, 41B adjust the brake fluid pressure ejected from pressurizing pumps 73A, 73B to be described later by the control of the valve opening degree according to an amount of power supply and release the pressure to the master cylinder 22 side.

In the fluid pressure adjuster 40, the first fluid pressure path 24A is connected to the fluid pressure path 42A via the master cut valve 41A, and the second fluid pressure path 24B is connected to the fluid pressure path 42B via the master cut valve 41B. The fluid pressure path 42A is connected with a fluid pressure path 31*fr* of the front right wheel and a fluid pressure path 31*rl* of the rear left wheel. The fluid pressure path 42B is connected with a fluid pressure path 31*fl* of the front left wheel and a fluid pressure path 31*rr* of the rear right wheel.

Holding valve 51 is disposed on the fluid pressure path 31 to each wheel. The holding valves 51 are so-called normally-open electromagnetic valves and a valve opening degree can be changed under the control of the brake controller. When opened, each holding valve 51 causes the brake fluid, which has been sent from the fluid pressure paths 42A, 42B to the fluid pressure path 31 as a target, to flow to a downstream side. A downstream direction means a flow direction of the brake fluid when the brake force is generated (specifically, a direction toward the brake force generator 30**). Thus, an upstream direction means a reverse direction of the flow direction of the brake fluid when the brake force is generated.

Reducing valve 52 is connected to the fluid pressure path 31 to each wheels at downstream side of the holding valve 51. The reducing valves 52 are so-called normally-close electromagnetic valves and a valve opening degree can be changed under the control of the brake controller. Since the brake fluid having passed through the holding valves 51 does not pass through the reducing valves 52 when closed, it is sent to the brake force generator 30. Each reducing valve 52 is further connected with a fluid pressure path 53 of each wheel. When opened, the reducing valves 52 can cause the brake fluid having passed through the holding valves 51 to flow to the fluid pressure paths 53. Fluid pressure paths 53*fr*, 53*rl* of the first fluid pressure circuit are connected to a fluid pressure path 54A. The fluid pressure path 54A is connected to an auxiliary reservoir 71A of a pressurizer 70 to be described later. In contrast, fluid pressure paths 53*fl*, 53*rr* of the second fluid pressure circuit are connected to a fluid pressure path 54B. The fluid pressure path 54B is connected to an auxiliary reservoir 71B of the pressurizer 70.

A check valve 61 is disposed between the first fluid pressure path 24A and the fluid pressure path 42A in parallel with the master cut valve 41A. The check valve 61 allows only a flow of the brake fluid from the first fluid pressure path 24A side to the fluid pressure path 42A side. Likewise, a check valve 62 is disposed between the second fluid pressure path 24B and the fluid pressure path 42B in parallel with the master cut valve 41B. The check valve 62 allows only a flow of the brake fluid from the second fluid pressure path 24B side to the fluid pressure path 42B side.

In the first fluid pressure circuit, a check valve 63 is disposed between the fluid pressure path 42A and the fluid pressure path 31*fr* in parallel with the holding valve 51*fr* and a check valve 64 is disposed between the fluid pressure path 42A and the fluid pressure path 31*rl* in parallel with the holding valve 51*rl*. The check valves 63, 64 allow only a flow of the brake fluid from the brake force generators 30*fr*, 31*rl* sides to the master cut valve 41A side. In contrast, in the second fluid pressure circuit, a check valve 65 is disposed between the fluid pressure path 42B and the fluid pressure path 31*rr* in parallel with the holding valve 51*rr* and a check valve 66 is dispose between the fluid pressure path 42B and the fluid pressure path 31*fl* in parallel with a holding valve 51*fl*. The check valves 65, 66 allow only a flow of the brake fluid from the brake force generators 30*rr*, 30*fl* side to the master cut valve 41B side.

The fluid pressure adjuster 40 includes the pressurizer 70 for pressurizing the brake fluid.

The pressurizer 70 includes the auxiliary reservoirs 71A, 71B. When the reducing valves 52*fr*, 52*rl* are in an open state, the brake fluid is sent to the auxiliary reservoir 71A of the first fluid pressure circuit via the fluid pressure path 54A. Likewise, when the reducing valves 52*fl*, 52*rr* are in the open state, the brake fluid is sent to the auxiliary reservoir 71B of the second fluid pressure circuit via the fluid pressure path 54B.

In the first fluid pressure circuit, the fluid pressure path 54A and the auxiliary reservoir 71A are connected to an end of a pump path 72A. The other end of the pump path 72A is connected to the fluid pressure path 42A. The pressurizer 70 includes the pressurizing pump 73A on the pump path 72A. The pressurizing pump 73A sucks the brake fluid of the fluid pressure path 54A and the auxiliary reservoir 71A and ejects it to the fluid pressure path 42A. The pressurizing pump 73A is operated using a driving force of a pump motor (electric motor) 74. The brake controller drives the pump motor 74 and sends the brake fluid pressurized by the pressurizing pump 73A to the fluid pressure path 42A (upstream of the holding valves 51*fr*, 51*rl*). Further, a check valve 75A is disposed above the pump path 72A so that the brake fluid ejected from the pressurizing pump 73A does not return to the pressurizing pump 73A. A check valve 76A is disposed on the pump path 72A so that the brake fluid sucked to the pressurizing pump 73A does not flow backward.

An end of a first suction path 43A is connected to a suction side of the pressurizing pump 73A in the pump path 72A (between the fluid pressure path 54A and the auxiliary reservoir 71A, and the check valve 76A). The other end of the first suction path 43A is connected to a suction valve 44A. The suction valve 44A is a so-called normally-close electromagnetic valve and a valve opening degree can be changed under the control of the brake controller. The suction valve 44A is connected to the first fluid pressure path 24A via a second suction path 45A. The brake controller can supply the master cylinder pressure to a suction side of the pressurizing pump 73A via the first and second suction paths 43A, 45A by opening the suction valve 44A. Thus, the pressurizing pump 73A can also pressurize the master cylinder pressure. A check valve 77A is disposed to the pump path 72A so that the master cylinder pressure is not supplied to the fluid pressure path 54A and the auxiliary reservoir 71A.

In contrast, also in the second fluid pressure circuit, likewise the first fluid pressure circuit, the pressurizer 70 includes a pump path 72B having an end connected to the fluid pressure path 54B and the auxiliary reservoir 71B and the other end connected to the fluid pressure path 42B, and a pressurizing pump 73B on the pump path 72B. The pressurizing pump 73B is operated by a pump motor 74 in the same way as the pressurizing pump 73A of the first fluid pressure circuit. Likewise the first fluid pressure circuit, the second fluid pressure circuit includes a check valve 75B disposed so that the brake fluid ejected from the pressurizing pump 73B does not return to the pressurizing pump 73B and a check valve 76B disposed so that the brake fluid sucked to the pressurizing pump 73B does not flow backward.

Further, likewise the first fluid pressure circuit, the second fluid pressure circuit includes a first suction path 43B having an end connected to a suction side of the pressurizing pump 73B in the pump path 72B (between the fluid pressure path 54B and the auxiliary reservoir 71B, and the check valve 76B), a suction valve (a normally-close electromagnetic valve) 44B connected with the other end of the first suction path 43B, and a second suction path 45B having an end connected to a suction valve 44B and the other end connected to the second fluid pressure path 24B. Thus, the pump path 72B is disposed with a check valve 77B so that the master cylinder pressure from the first suction path 43B is not supplied to the fluid pressure path 54B and the auxiliary reservoir 71B.

In the pressurizer 70, driving the pump motor 74 by the brake controller causes the brake fluid pressurized by the pressurizing pump 73B to be sent to the fluid pressure path 42B (upstream of the holding valves 51*fl*, 51*rr*). At the time, the brake fluid of the fluid pressure path 54B and the auxiliary reservoir 71B is sucked by the pressurizing pump 73B, and when the suction valve 44B is opened by the brake controller, the master cylinder pressure is supplied to a suction side of the pressurizing pump 73B via the first and second suction paths 43B, 45B. The brake controller may place the suction valves 44A, 44B in an excited state (may place them in an open state by energizing them) or may place them in a non-excited state (may place them in a closed state by not energizing them) when drives and controls the pump motor 74.

Next, a control carried out to the brake system by the brake controller will be explained.

When the brake controller increases the fluid pressure supplied to a brake force generator 30 of a control target wheel (a pressure increase mode), the brake controller places the master cut valve 41A (41B) and a holding valve 51 corresponding to the control target wheel in a non-exited state (place them in the open state by not energizing them), places a reducing valve 52 corresponding to the control target wheel in the non-exited state (place it in the closed state by not energizing it), and drives and controls the pump motor 74. With the operation, in the brake system, the brake fluid sucked by the two pressurizing pumps 73A, 73B are pressurized, and the pressurized brake fluid pressure is supplied upstream of all the holding valves 51. The pressurized brake fluid pressure is supplied to the brake force generator 30 of the control target wheel via the holding valve 51.

Further, when the brake controller decreases the fluid pressure supplied to the brake force generator 30 of the control target wheel (at a pressure decrease mode), the brake controller places the master cut valve 41A (41B) and the holding valve 51 corresponding to the control target wheel in the exited state (place them in the closed state by energizing them) and places the reducing valve 52 corresponding to the control target wheel also in the exited state (place it in the open state by energizing it). At the time, when no control target wheel of the pressure increase mode exists, the brake controller neither drives nor controls the pump motor 74, whereas when a control target wheel of the pressure increase mode exists, the brake controller drives and controls the pump motor 74. Although the brake fluid of a control target wheel of the pressure reduction mode is sent to the auxiliary reservoir 71A (71B) corresponding to the control target wheel, when the control target wheel of the pressure increase mode exists in same fluid pressure circuit, the brake fluid is sucked to the pressurizing pump 73A (73B) corresponding to the control target wheel. When an excessive brake fluid exists, the brake controller may place the suction valve 44A (44B) corresponding to the control target wheel in the excited state (may place it in the open state by energizing it) so as to send the excessive brake fluid to the reservoir tank 23 via the first suction path 43A (43**B).

When the brake fluid pressure of the brake force generator 30\*\* of the control target wheel becomes a predetermined brake fluid pressure in the pressure increase mode or pressure reduction mode, the brake controller controls the master cut valve 41A (41B) and a holding valve 51\*\* corresponding to the control target wheel to the excited state (controls them to be in the closed state by energizing them) and controls a reducing valve 52\*\* corresponding to the control target wheel to the non-exited state (controls it to be in the closed state by not energizing it). In the holding mode, the brake fluid pressure of the brake force generator 30\*\* of the control target wheel is held at the predetermined brake fluid pressure.

The brake system can carry out the brake assist control and the pre-collision brake control. The brake assist control is a control for supplying brake fluid pressure higher than brake fluid pressure according to the brake operation of the driver to each wheel\*\*. The pre-collision brake control is a control for supplying high brake fluid pressure to each wheel\*\* when a possibility of collision of the driver's own vehicle exists. In any of the controls, the brake controller places the master cut valves 41A, 41B in the excited state (places them in the closed state by energizing them), places the holding valves 51\*\* of all the wheels\*\* in the non-exited state (places them in the open state by not energizing them), places the reducing valves 52\*\* of all the wheels\*\* in the non-exited state (places them in the closed state by not energizing them), and drives and controls the pump motor 74.

Specifically, in the brake system, when the possibility of collision of the driver's own vehicle exists, the pressurized brake fluid pressure of the pressurizer 70 acts on fluid pressure channels (fluid pressure paths, etc.) between from the pressurizer 70 to the brake force generator 30\*\* of all the wheels\*\*. In the state, when any of the fluid pressure channels of the wheels\*\* is damaged due to collision, even if the brake fluid leaks from the damaged portion, since the pressurized brake fluid pressure continuously acts on the fluid pressure channel to which the damage has occurred, the brake fluid pressure detected in the damaged fluid pressure channel is gently reduced. When the brake controller detects the reduction of the brake fluid pressure, the brake controller increases the pressurized brake fluid pressure to return the brake fluid pressure to a request value. Thus, the brake fluid pressure is reduced more gently in the fluid pressure channel to which the damage has occurred.

The brake ECU 1 includes an abnormality detecting unit for detecting abnormality of the fluid pressure channel accompanied by the reduction of the brake fluid pressure. For example, when the brake fluid pressure becomes equal to or smaller than a predetermined pressure as a threshold value, the abnormality detecting unit detects that abnormality occurs to the fluid pressure channel. The predetermined pressure is changed according a requested brake fluid pressure (the requested brake force). When the brake fluid pressure is gently reduced by the pressurized brake fluid pressure, a time is required until the brake fluid pressure has become equal to or smaller than the predetermined pressure. This prevents the abnormality detecting unit from determining whether or not the reduction of the brake fluid pressure is caused by the abnormality such as a damage of the fluid pressure channel until the predetermined requirement has established. Specifically, in the case, a time is taken until the abnormality of the fluid pressure channel has been detected regardless that the damaged fluid pressure channel exists.

In the brake system, since a fluid pressure channel of other wheel\*\* exists in the same system as that of the damaged fluid pressure channel of a wheel\*\*, the fluid pressure channels of both the wheels\*\* communicate with each other in the state that the pressurized brake fluid pressure acts thereon. Thus, there is a possibility that the brake fluid pressure is reduced due to a leakage of the brake fluid from a damaged portion in the other fluid pressure channel of the same system even if no damage occurs in the fluid pressure channel of the different wheel\*\*. In a wheel\*\* having a normal fluid pressure channel, since the brake fluid pressure is continuously reduced until abnormality of the fluid pressure channel to which the damage has occurred is detected, the brake force is continuously reduced than the request value.

To cope with the problem, the brake system is configured such that when the pressurized brake fluid pressure acts on the fluid pressure channel by the pressurizer 70 the abnormality detecting unit can detect the abnormality of the fluid pressure channel as soon as possible.

Specifically, when a possibility of collision of the driver's own vehicle has been detected and the pressurized brake fluid pressure has been supplied to the fluid pressure channel by the pressurizer 70 (when, for example, the pre-collision brake control has been carried out), the brake controller reduces a pressurizing amount of the brake fluid pressure supplied to the fluid pressure channel to 0 in the state that the possibility of the collision has been detected and before the collision of the driver's own vehicle (more preferably, just before the collision of the driver's own vehicle). In the embodiment, to reduce the pressurizing amount of the brake fluid pressure supplied to the fluid pressure channel, the brake controller is caused to control the pump motor 74 while it is being driven. The control of the pump motor 74 (the control of the pressurizer 70) for reducing the pressurizing amount of the brake fluid pressure is carried out without a request for releasing the pre-collision brake control by the driver, for example, an accelerator operation. Reducing the pressurizing amount to 0 is to stop the pump motor 74 while it is being driven. Thus, when the possibility of collision of the driver's own vehicle has been detected and the pressurized brake fluid pressure has been supplied to the fluid pressure channel by the pressurizer 70, the brake controller of the embodiment reduces the pressurizing amount of the brake fluid pressure supplied from the pressurizer 70 to the fluid pressure channel to 0 by stopping the pump motor 74 before the driver's own vehicle collides in the state that the possibility of collision of the driver's own vehicle has been detected. Incidentally, the expression "before the driver's own vehicle collides in the state that the possibility of collision of the driver's own vehicle has been detected" means a state that when it has been detected that the driver's own vehicle has a possibility of collision and that avoidance of the collision thereof is impossible. Thus, when the possibility of collision of the driver's own vehicle has been detected and the pressurized brake fluid pressure has been supplied to the fluid pressure channel by the pressurizer 70, the brake controller reduces the pressurizing amount of the brake fluid pressure supplied to the fluid pressure channel to 0 at the time of detecting that avoidance of the collision is impossible.

When no abnormality occurs in the fluid pressure channel (the pump paths 72A, 72B) from the pressurizer 70 to upstream side of the respective holding valves 51 just after the pressurizing amount of the brake fluid pressure by the pressurizer 70 has been reduced to 0 (just after the pump motor 74 has been stopped), the pressurized brake fluid pressure that has been supplied until the pump motor 74 is stopped acts on upstream side of all the holding valves 51. At the time, when no abnormality occurs in the fluid pressure channel (the fluid pressure paths 31) downstream side of the holding valve 51 in the open valve state, the pressurized brake fluid pressure before the pump motor 74 stops acts on also the fluid pressure channel.

Even if the driver's own vehicle collides in the state that the pressurizing amount is 0 thereafter, when no damage occurs to the fluid pressure channel downstream side of the pressurizer 70, the fluid pressure sensor 32** detects a value approximately the same as the pressurized brake fluid pressure having been supplied before the pump motor 74 is stopped. Thus, the abnormality detecting unit determines that no abnormality occurs in the fluid pressure channel downstream side of the pressurizer 70. In the brake system at the time, when, for example, the pre-collision brake control has been carried out before the pressurizer 70 is stopped, since the pressurized brake fluid pressure before the pressurizer 70 is stopped remains in the fluid pressure channel downstream side of the pressurizer 70 (an upper view of FIG. 3) even after the pressurizer 70 is stopped, the requested brake force in the pre-collision brake control can be approximately kept while the control continues.

Figure 3:
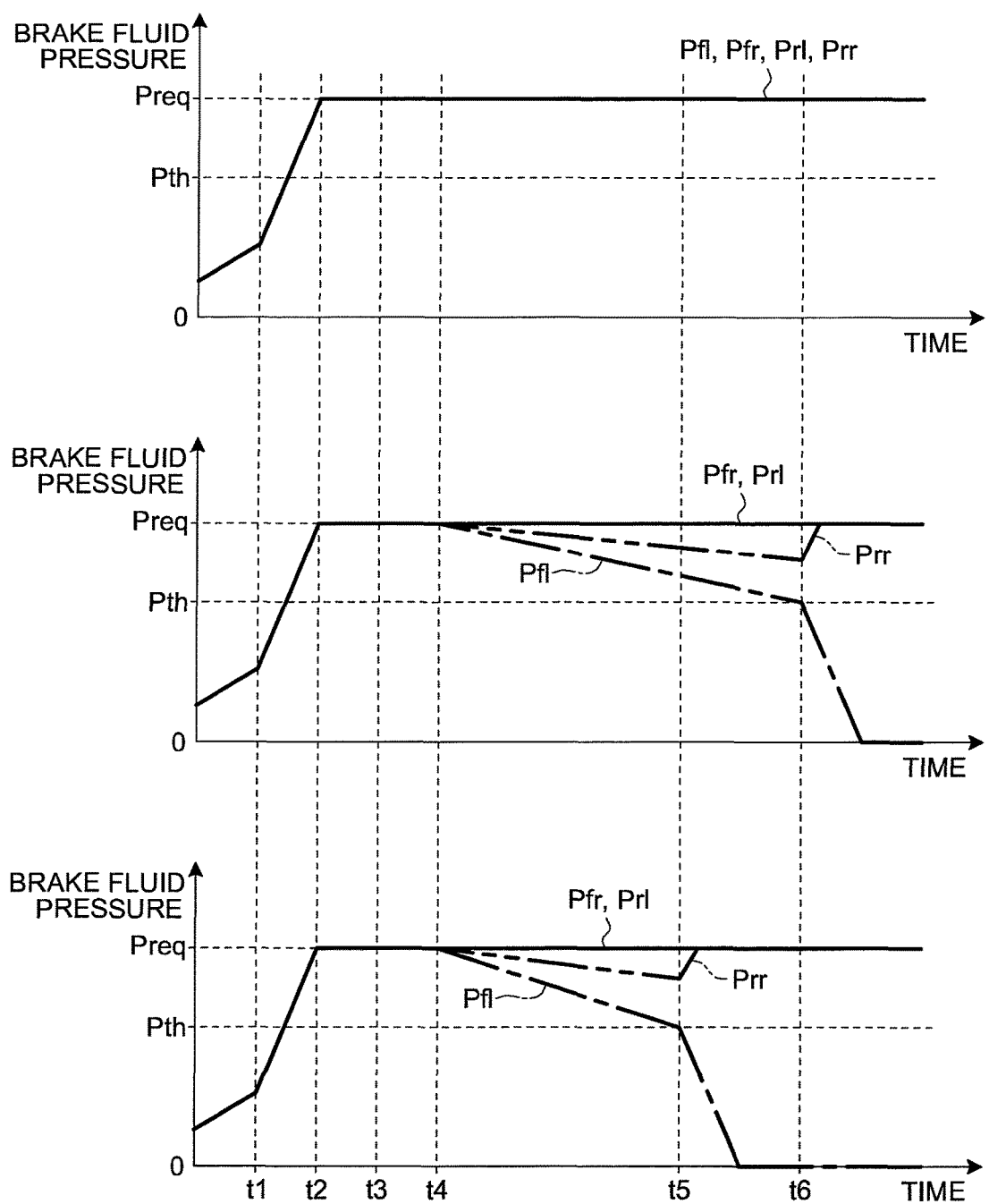
FIG. 3 is a view illustrating a state of a brake fluid pressure acting on a brake force generator of each wheel as a time passes when a pressurizer is stopped.

FIG. 3 illustrates a state of brake fluid pressure P acting on the brake force generator 30 of each wheel** as a time passes. In FIG. 3, the brake assist control is carried out until time t1. In FIG. 3, it is determined that a collision cannot be avoided at time t1 and the pre-collision brake control is started, and the brake fluid pressure increases to a requested brake fluid pressure Preq of the pre-collision brake control at time t2. Further, in FIG. 3, the pressurizer 70 is stopped at time t3. In the upper view of FIG. 3, since no abnormality occurs in the fluid pressure channel downstream side of the pressurizer 70, the requested brake fluid pressure Preq continuously acts on the fluid pressure channel.

In contrast, when the driver's own vehicle collides in the state of the pressurizing amount 0, a damage occurs in the fluid pressure channel downstream side of the pressurizer 70, and the brake fluid leaks, the fluid pressure sensor 32 communicating with a damaged portion detects brake fluid pressure lower than the pressurized brake fluid pressure supplied before the pump motor 74 stops (i.e. the requested brake fluid pressure Preq). When the brake fluid pressure detected by a fluid pressure sensor 32 becomes lower than the pressurized brake fluid pressure before the pump motor 74 stops, a fluid pressure channel where it is thought that abnormality occurs may be the fluid pressure path 31 communicating with the fluid pressure sensor 32 or may be the pump path 72A (72B) communicating with the fluid pressure path 31 via the holding valves 51 in the open valve state.

When the brake fluid leaks while the pressurizer 70 stops, since a new brake fluid is not supplied from the pressurizer 70, brake fluid pressure that has reduced to predetermined pressure Pth (a threshold value used by the abnormality detecting unit) is detected by the fluid pressure sensor 32/1 at a stage earlier time "t6−t5" in advance (a lower view of FIG. 3) as compared with a case that the pressurizer 70 illustrated in a middle view of FIG. 3 is not stopped. Thus, the abnormality detecting unit can detect that abnormality occurs in a fluid pressure channel and can specify the fluid pressure channel where the abnormality occurs in an earlier stage in comparison with a case that the pressurizer 70 is not stopped. In the brake system at the time, when, for example, the pre-collision brake control has been carried out before the pressurizer 70 is stopped, since the pressurized brake fluid pressure before the pressurizer 70 is stopped approximately remains in a normal fluid pressure channel downstream side of the pressurizer 70 even after the pressurizer 70 has been stopped, the requested brake force in the pre-collision brake control can be approximately kept while the pre-collision brake system is continued. In the respective views of FIG. 3, the holding valves 51 are opened and the reducing valve 52 are closed in all the wheels**.

The middle view and the lower view of FIG. 3 illustrate a state that the brake fluid leaks only from the fluid pressure channel (the fluid pressure path 31fl) of the front left wheel due to collision. The fluid pressure channel (the fluid pressure path 31rr) of the rear right wheel that exists in the second fluid pressure circuit of the same system as the front left wheel communicates with the fluid pressure channel (the fluid pressure path 31fl) of the front left wheel. Thus, the brake fluid pressure of the fluid pressure channel (the fluid pressure path 31rr) is reduced in a degree smaller than the front left wheel. Time t4 of FIG. 3 is a time at which the brake fluid starts to leak due to collision. Times t5, t6 are times at which brake fluid pressure Pfl of the front left wheel has reduced to the predetermined pressure Pth and the abnormality detecting unit has detected abnormality of the fluid pressure path 31fl. Times t5, t6 are times at which a control starts to close the holding valve 51fl and the reducing valve 51fl of the front left wheel and the pressurizer 70 is restarted to increase the brake fluid pressure Prr of the rear right wheel to the requested brake fluid pressure Preq.

An arithmetic processing operation of the brake control device of the embodiment will be explained below based on a flowchart of FIG. 4. The exemplification is such a case that the pressurizer 70 is stopped before the collision of the driver's own vehicle.

The drive support ECU 94 determines whether or not there is a possibility that the driver's own vehicle collides (step ST1).

The determination is carried out using a known determination mode in such as a collision avoiding control. For example, the drive support ECU 94 includes a collision possibility determining unit for determining the possibility of collision of the driver's own vehicle. The collision possibility determining unit determines a presence or an absence of an obstacle which is predicted to reduce an interval between the driver's own vehicle and the obstacle using information detected by the periphery monitor 95. When the obstacle is detected, the collision possibility determining unit determines whether or not there is a possibility that the driver's own vehicle collides the obstacle based on a change of the interval between the driver's own vehicle and the obstacle and a change of a relative speed between the obstacle and the driver's own vehicle, and so on. When there is no possibility of collision, the drive support ECU 94 finishes the arithmetic processing once.

When the possibility of collision of the driver's own vehicle exists, the drive support ECU 94 notifies the driver of the possibility (step ST2).

For example, the drive support ECU 94 includes a notification controller for transmitting information to an occupant in a compartment. The notification controller notifies that the possibility of collision of the driver's own vehicle exists as visual information and audio information. For example, the notification controller displays characters and marks for notifying the possibility on a display (illustration omitted) in the compartment. Further, the notification controller may cause a speaker (illustration omitted) in the compartment to output a voice or a warning sound for notifying the possibility.

The collision possibility determining unit determines whether or not the possibility of collision of the driver's own vehicle is high (step ST3). It is sufficient to carry out the determination based on the change of the interval between the driver's own vehicle and the change of the relative speed between the driver's own vehicle and the obstacle. When the possibility of collision is low, the drive support ECU 94 finishes the arithmetic processing once.

Although it is thought that the driver who has recognized that the possibility of collision exists instantly carries out a brake operation, there is such a case that the brake operation is not carried out because of, for example, a reason that the recognition is delayed. Thus, when the possibility of collision is high, the drive support control unit of the drive support ECU 94 determines whether or not the brake operation is carried out by the driver (step ST4). The determination is carried out based on a brake operation amount detected by the pedal sensor 11. The determination may be carried out based on an on signal of a stop lamp switch (illustration omitted).

When the driver does not carry out the brake operation, the drive support control unit goes to step ST6 described below. In contrast, when the driver carries out the brake operation, the drive support control unit carries out the brake assist control (step ST5).

In the exemplification, the drive support control unit sends a command for carrying out a brake assist control to the brake ECU 1, and the brake controller of the brake ECU 1, which receives the command, carries out the brake assist control by controlling the fluid pressure adjuster 40. The brake controller closes both the master cut valves 41A, 41B and supplies the pressurized brake fluid pressure by the pressurizer 70 to upstream side of the holding valves 51\*\* of all the wheels\*\* by driving the pump motor 74. At the time, the brake controller replaces the master cylinder pressure with the pressurized brake fluid pressure while increasing the pressurized brake fluid pressure. At the time, the holding valves 51\*\* of all the wheels\*\* are opened and the reducing valves 52\*\* of all the wheels\*\* are closed.

The collision possibility determining unit determines whether the collision of the driver's own vehicle cannot be avoided or not (step ST6). The determination is made to decide whether or not the collision can be avoided while keeping a traveling attitude (a traveling direction) of the driver's own vehicle at the time, and it is sufficient to make the decision based on the change of the interval between the driver's own vehicle and the obstacle and the change of the relative speed between the driver's own vehicle and the obstacle. When the drive support ECU 94 determines that the collision can be avoided in the state at the time, the arithmetic processing is finished once.

When the drive support ECU 94 determines that the collision cannot be avoided in the state at the time, the drive support control unit carries out the pre-collision brake control to cope with the collision (step ST7).

In the exemplification, the drive support controller sends a command for carrying out the pre-collision brake control to the brake ECU 1, and the brake controller of the brake ECU 1 that receives the command controls the fluid pressure adjuster 40 to thereby carry out the pre-collision brake control. When the brake assist control is being carried out, the brake controller increases the output torque of the pump motor 74 and increases the pressurized brake fluid pressure by the pressurizer 70 to the requested brake fluid pressure Preq. In contrast, when the brake assist control is not carried out, the brake controller closes both the master cut valves 41A, 41B and drives the pump motor 74 to thereby increase the pressurized brake fluid pressure by the pressurizer 70 to the requested brake fluid pressure Preq of the pre-collision brake control. FIG. 3 explained previously illustrates the former case.

After the pre-collision brake control has been started, the collision possibility determining unit determines whether or not a predicted time Ttc until the collision of the driver's own vehicle is equal to or smaller than a predetermined time Tth11 (step ST8).

The predicted time Ttc until the collision can be determined based on the interval between the driver's own vehicle and the obstacle and the relative speed between the driver's own vehicle and the obstacle. The predicted time Ttc until the collision is calculated assuming that the traveling direction of a vehicle does not change from the direction at the time. Thus, when the predicted time Ttc until the collision is long, there is a possibility that the collision can be avoided by changing the traveling direction of the driver's own vehicle by a steering operation by the driver and a turning control of wheels\*\* by the drive support ECU 94. Thus, in the exemplification, the predetermined time Tth11 is determined in consideration of the point. Specifically, the predetermined time Tth11 is a threshold value for determining whether or not the pressurizer 70 is to be stopped or not and is determined based on whether or not a time remains during which the collision can be avoided by changing the traveling direction of the driver's own vehicle.

The predetermined time Tth11 may be changed according to the interval between the driver's own vehicle and the obstacle, the relative speed between the driver's own vehicle and the obstacle, and a steering angle (a turning angle of the wheels\*\* of the driver's own vehicle) by the driver's operation. For example, since a narrower interval between the driver's own vehicle and the obstacle more reduces a possibility capable of avoiding collision by changing a traveling direction. Thus it is sufficient to increase a probability for advancing a process to an abnormality detection control described below by setting the predetermined time Tth11 longer to the narrower interval. Further, a larger relative speed between the driver's own vehicle and the obstacle (which is a speed when the driver's own vehicle approaches the obstacle) more reduces the possibility capable of avoiding collision by changing the traveling direction. Thus, it is sufficient to increase the probability for advancing the process to the abnormality detection control described below by setting the predetermined time Tth11 longer to the larger relative speed. A larger steering angle (the turning angle) more reduces a vehicle speed of a vehicle than at the time of neutral steering. Thus, a smaller steering angle (the turning angle) more reduces the possibility capable of avoiding collision by changing the traveling direction. Here, it is sufficient to increase the probability for advancing the process to the abnormality detection control described below by setting the predetermined time Tth11 longer to the smaller steering angle (the turning angle).

When the predicted time Ttc until the collision is longer than the predetermined time Tth11, since the possibility capable of avoiding collision exists, the drive support ECU 94 finishes the arithmetic processing once. In contrast, when the predicted time Ttc until the collision is equal to or smaller than the predetermined time Tth11, since the possibility capable of avoiding collision does not exists, the drive support ECU 94 delivers the arithmetic processing to the brake ECU 1.

To cope with a case that the fluid pressure channel is damaged due to collision, the brake ECU 1 carries out the abnormality detection control for detecting abnormality of the fluid pressure channel (step ST9). The abnormality detection control will be explained based on a flowchart of FIG. 5.

The brake controller stops the pressurizer 70 by stopping the pump motor 74 being driven (step ST9A). Specifically, when the possibility of collision of the driver's own vehicle is detected and when it is detected that the collision cannot be avoided, the brake controller starts a reduction control of the pressurizing amount of the brake fluid pressure caused by the stop control of the pressurizer 70. Although the brake controller may instantly stop the pump motor 74, the controller may stop the pump motor 74 by finally reducing output torque of the pump motor 74 to 0 while linearly or nonlinearly reducing the output torque.

When a collision determining unit of the drive support ECU 94 detects the collision of the driver's own vehicle after the pressurizer 70 has stopped (step ST9B), the abnormality detecting unit calculates an elapsed time Tlap elapsed from the collision and determines whether or not the elapsed time Tlap is equal to or smaller than a predetermined time Tth12 (step ST9C). When, for example, an acceleration of the vehicle detected by an acceleration sensor exceeds a predetermined threshold value, the collision determining unit detects the collision of the driver's own vehicle. Further, the collision determining unit may detect the collision of the driver's own vehicle based on an output signal of an airbag sensor (illustration omitted).

The abnormality detecting unit carries out the arithmetic processing steps after step ST9C to each wheel. Even if the abnormality detecting unit has finished the arithmetic processing steps after step ST9C to all the wheels, the detecting unit preferably repeats the arithmetic processing steps after step ST9C to each wheel again until a negative determination (Tlap>Tth12) is satisfied at step ST9C. This is because there is a possibility that the brake fluid pressure P does not reduce to the predetermined pressure Pth until the negative determination is made at step ST9C.

The predetermined time Tth12 is a threshold value for determining a state of the fluid pressure channel downstream side of the pressurizer 70 after collision and is determined based on a reducing speed of the brake fluid pressure in a state that the pressurizer 70 has been stopped. When, for example, the abnormality detecting unit does not detect abnormality even if the elapsed time Tlap has elapsed a certain time after collision, it may be determined that no abnormality occurs in the fluid pressure channel downstream side of the pressurizer 70. The elapsed time Tlap which makes it possible to determine that no abnormality has occurred is a time until the brake fluid pressure is reduced to the predetermined pressure Pth and depends on the reducing speed of the brake fluid pressure. Thus, the predetermined time Tth12 is set to a reduction time to the predetermined pressure Pth here.

When the elapsed time Tlap after collision is equal to or smaller than the predetermined time Tth12, the abnormality detecting unit determines whether or not the brake fluid pressure P detected by the fluid pressure sensor 32 of a certain wheel** becomes equal to or smaller than the predetermined pressure Pth (step ST9D).

When the brake fluid pressure P relating to the wheel is equal to or smaller than the predetermined pressure Pth, the abnormality detecting unit determines that abnormality occurs in the fluid pressure channel downstream side of the pressurizer 70 relating to the wheel (step ST9E). In contrast, when the brake fluid pressure P relating to the wheel is higher than the predetermined pressure Pth, the abnormality detecting unit determine that no abnormality occurs in the fluid pressure channel downstream side of the pressurizer 70 relating to the wheel (step ST9F).

The abnormality detecting unit updates state information (presence or absence of abnormality) of the fluid pressure channel of the wheel** based on the result of determination at step ST9E or at step ST9F (step STSG). For example, the abnormality detecting unit stores the state information in a temporarily storage unit of the brake ECU 1.

The abnormality detecting unit finds the presence or absence of abnormality in the fluid pressure channel downstream side of the pressurizer 70 by carrying out the arithmetic processing steps after step ST9C to all the wheels. When the abnormality detecting unit determines that no abnormality has occurred to the fluid pressure paths 31 of all the wheels, the abnormality detecting unit determines that no abnormality has occurred also in the pump paths 72A, 72B. In contrast, when the abnormality detecting unit determines that abnormality has occurred in a fluid pressure path 31 of a wheel in the first fluid pressure circuit, the abnormality detecting unit determines that abnormality has occurred only in the fluid pressure path 31 of the wheel or both the fluid pressure path 31 of the wheel** and the pump path 72A, or only in the pump path 72A. This is the same as to the second fluid pressure circuit.

After the presence or absence of abnormality of the fluid pressure channels has been clarified, the brake controller carries out a maneuvering stability improvement control (a maneuvering stabilization control) of the driver's own vehicle using the brake fluid pressure of a fluid pressure path 31 without abnormality (step ST10). At the time, the brake controller restarts the pressurizer 70 and supplies the pressurized brake fluid pressure to the fluid pressure path 31 without abnormality. Further, the brake controller controls the holding valve 51 and the reducing valve 52 according to a requested brake force to a wheel of the fluid pressure path 31 without abnormality.

As shown above, when the pressurized brake fluid pressure has been supplied to the fluid pressure channel by the pressurizer 70, the brake control device of the embodiment reduces the pressurizing amount of the brake fluid pressure supplied from the pressurizer 70 to the fluid pressure channel to 0 by reducing the output torque of the pump motor 74 being driven to 0 before the driver's own vehicle collides in the state that the possibility of collision of the driver's own vehicle has been detected (when it has been detected that the driver's own vehicle has a possibility of collision and that avoidance of the collision thereof is impossible). Since the brake control device can reduce the brake fluid pressure of the fluid pressure channel to which a damage has occurred more quickly than when the pressurized brake fluid pressure is continuously supplied, the abnormality detecting unit can detect the abnormality of the fluid pressure channel at an early stage.

Further, the brake control device can also specify the fluid pressure channel to which abnormality has occurred at an early stage. As a result, the brake control device can specify the fluid pressure channel of other wheel of the same system as that of the fluid pressure channel of the wheel to which the abnormality has occurred. As described above, the brake fluid pressure is reduced in the fluid pressure channel of the other wheel even if no brake fluid leaks in the fluid pressure channel. Thus, when the fluid pressure channel of the other wheel is normal, the brake control device can return the brake fluid pressure of the fluid pressure channel of the normal wheel to the request value at an early stage by, for example, increasing the pressurized brake fluid pressure by restarting the pressurizer 70.

When the pressurizer 70 is restarted, as explained also in FIG. 3, it is preferable to close the holding valve 51 and the reducing valve 52** connected to the fluid pressure path 31** whose abnormality has been detected. When the holding valve 51** is closed, since no new brake fluid is supplied to the fluid pressure path 31** downstream side of the holding valve 51**, a further leakage of the brake fluid can be suppressed. Closing the holding valve 51** can suppress the pressurizing amount of the brake fluid pressure by the pressurizer 70 according to the requested brake force to a smaller amount in comparison with a case that the holding valve 51** remains opened. At the time, since the output torque of the pump motor 74 can be suppressed small, a power consumption amount necessary to drive the pump motor 74** can be reduced, and, for example, the reduced electric power can be used to drive other electric equipment such as auxiliary equipment.

Further, since the brake control device prompts to reduce, at an early stage, the brake fluid pressure of the fluid pressure channel to which the abnormality has occurred in comparison with when the pressurizer 70 is not stopped and a variation (a tilt of reduction) of the brake fluid pressure is large, a leakage speed of the brake fluid and remaining brake fluid pressure can be easily predicted. Thus, the brake control device can improve controllability of the maneuvering stabilization control described above.

First Modification

Incidentally, when the pressurized brake fluid pressure has been supplied to the fluid pressure channel by the pressurizer 70, the brake control device of the embodiment reduces the pressurizing amount of the brake fluid pressure supplied from the pressurizer 70 to the fluid pressure channel to 0 by stopping the pump motor 74 being driven before the driver's own vehicle collides in the state that the possibility of collision of the driver's own vehicle has been detected (when it has been detected that the driver's own vehicle has a possibility of collision and that avoidance of the collision thereof is impossible). One of reasons why the pressurizing amount reduction control is carried out before the collision of the driver's own vehicle is that it has been determined that the collision cannot be avoided. However, as explained also in the embodiment, the driver's own vehicle has a possibility for avoiding the collision changing its traveling direction. Further, when a obstacle of collision is a moving object such as a traveling vehicle, there is a possibility capable of avoiding collision depending on a movement of the moving object. When these possibilities are taken into consideration, a control for stopping the pressurizer 70 before the driver's own vehicle collides would become unnecessary if the collision could be avoided.

To cope with the problem, when a collision of the driver's own vehicle has been detected (that is, after the collision of the driver's own vehicle has been detected) at the time the pressurized brake fluid pressure is supplied to the fluid pressure channel by the pressurizer 70, a brake control device of the modification reduces the pressurizing amount of the brake fluid pressure supplied from the pressurizer 70 to the fluid pressure channel to 0 by stopping the pump motor 74 being driven. More preferably, the pump motor 74 being driven is stopped at the time of detecting the collision of the driver's own vehicle while the pressurized brake fluid pressure is supplied to the fluid pressure channel by the pressurizer 70.

Figure 4:
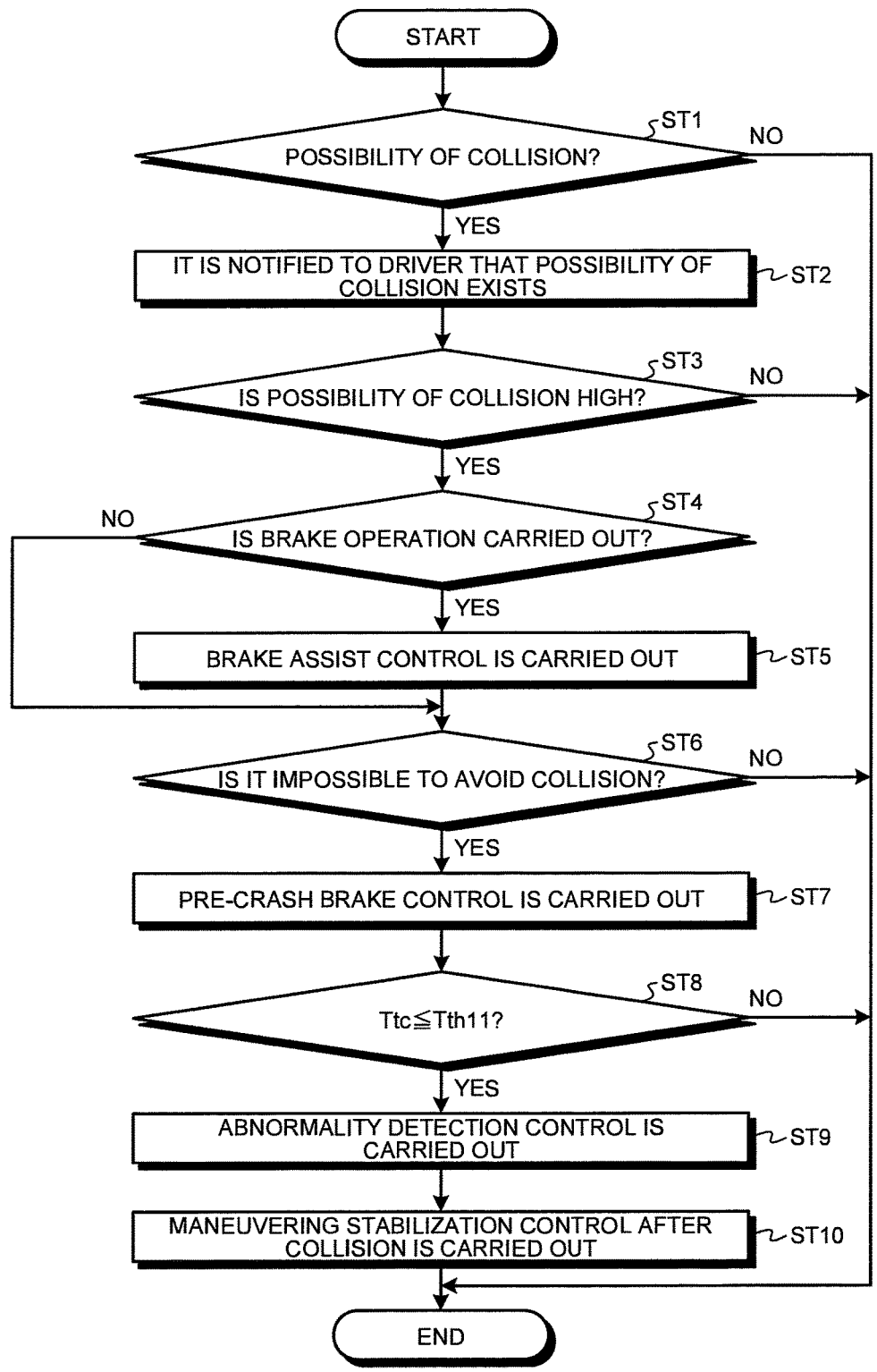
FIG. 4 is a flowchart explaining a control operation in the brake control device before and after a collision according to the invention.
Figure 5:
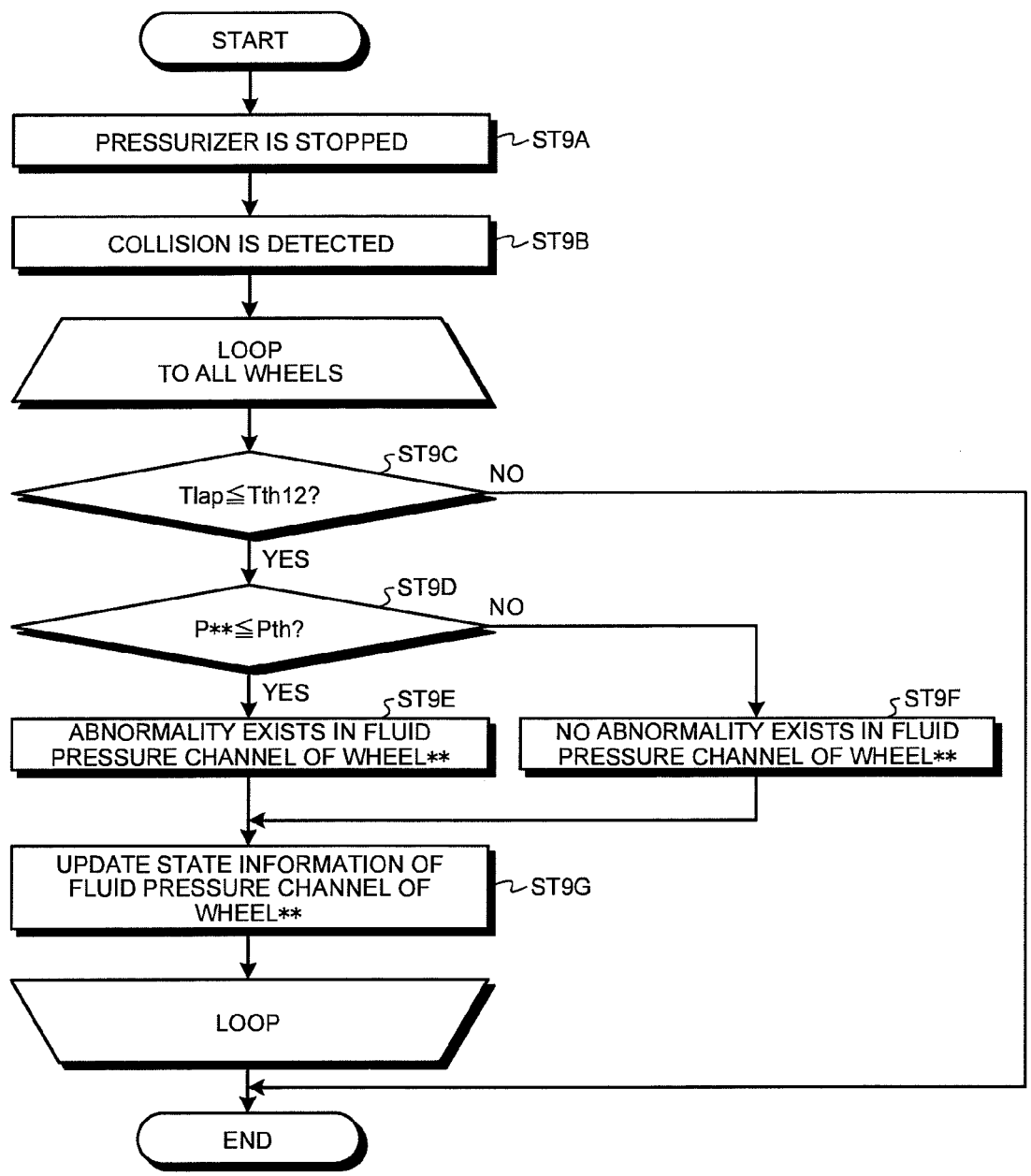
FIG. 5 is a flowchart explaining an abnormality detection control of the embodiment.

The brake control device of the modification carries out arithmetic processings illustrated in a flowchart of FIG. 4. Since the arithmetic processing in the modification is carried out as the same processing as that of the embodiment except that specific contents of the arithmetic processing at step ST9 are different, an explanation is omitted here.

Figure 6:
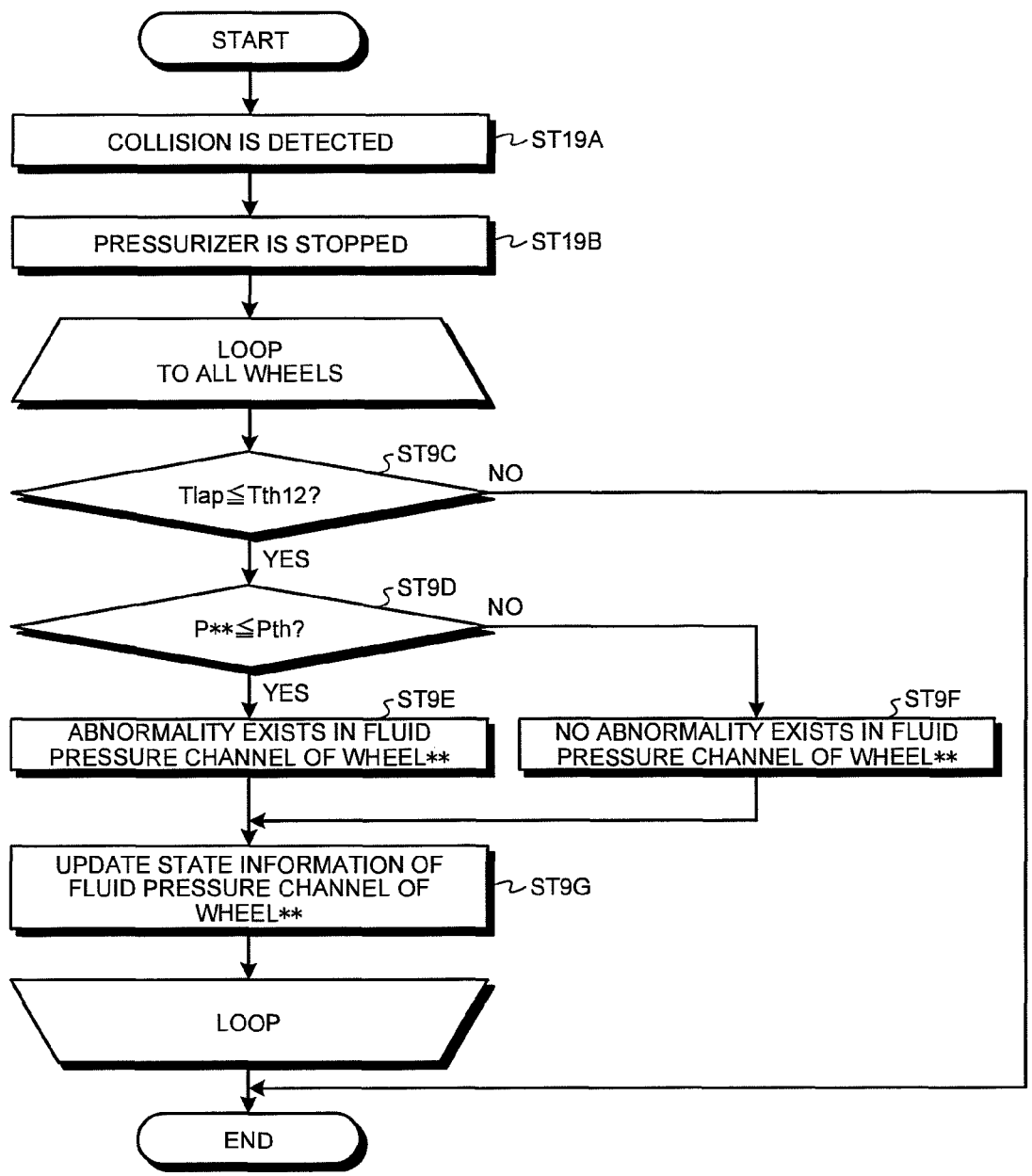
FIG. 6 is a flowchart explaining an abnormality detection control of the first modification.

A flowchart of FIG. 6 illustrates the specific contents of the arithmetic processing at the step ST9. In the arithmetic processing illustrated in the flowchart of FIG. 6, the arithmetic processing steps after step ST9C are the same as the arithmetic processing steps after step ST9C of the embodiment. Thus, an explanation after step ST9C will not be also repeated.

Specifically, when the predicted time Ttc until the collision is equal to or smaller than the predetermined time Tth11, the brake controller of the modification determines whether or not the collision of the driver's own vehicle has been detected by collision determining unit (step ST19A). When the collision of the driver's own vehicle has not been detected, the brake ECU 1 finishes the arithmetic processing once. In contrast, when the collision of the driver's own vehicle has been detected, the brake controller stops the pressurizer 70 by stopping the pump motor 74 being driven (step ST19B). Specifically, when the collision of the driver's own vehicle has been detected, the brake controller starts the reduction control of the pressurizing amount of the brake fluid pressure due to the stop control of the pressurizer 70. As explained also in the embodiment, the pump motor 74 may be instantly stopped or may be finally stopped while linearly or nonlinearly reducing output torque.

The abnormality detecting unit carries out the arithmetic processing steps after step ST9C to each wheel thereafter. In also the modification, even if the abnormality detecting unit has carried out the arithmetic processing steps after step ST9C to all the wheels, it is preferable to repeat the arithmetic processing steps after step ST9C again to each wheel until a negative determination (Tlap>Tth12) is satisfied at step ST9**C.

Even if the stop timing of the pressurizer 70 is different from that of the embodiment, the brake control device of the modification can obtain the same effect as the brake control device of the embodiment. When the collision of the driver's own vehicle can be avoided as a result, the brake control device needs not to carry out an unnecessary stop control of the pressurizer 70. Further, when the collision of the driver's own vehicle can be avoided as the result, the brake control device can avoid a reduction of the brake force compared to, for example, a requested brake force of the pre-collision brake control due to the stop of the pressurizer 70.

When the reduction control of the pressurizing amount of the brake fluid pressure is carried out after the collision of the driver's own vehicle as described above, the brake controller of the modification may pressurize the brake fluid pressure of the fluid pressure channel whose abnormality has not been detected according to a result of detection of the abnormality detecting unit by restarting the pressurizer 70 and causes the brake force generator 30 that connects to the fluid pressure channel to generate a brake force according to the pressurized brake fluid pressure. Specifically, when the reduction control of the pressurizing amount of the brake fluid pressure is carried out after the collision of the driver's own vehicle, the brake controller carries out an after-collision brake force control (a so-called post collision brake control) for generating a brake force according to the pressurized brake fluid pressure caused by the restart of the pressurizer 70** to a wheel that connects to the fluid pressure channel whose abnormality has not been detected. In also an exemplification described below, when the reduction control of the pressurizing amount of the brake fluid pressure is carried out after the collision of the driver's own vehicle, the post collision brake control may be carried out thereafter.

Second Modification

The brake control device of the embodiment or the first modification reduces the pressurizing amount of the brake fluid pressure supplied from the pressurizer 70 to the fluid pressure channel to 0. A reason why the pressurizer 70 is stopped as described above is that an early determination of the presence or absence of abnormality by the abnormality detecting unit can be realized and that an approximately the same brake force as that before the pressurizer 70 stops (for example, the requested brake force in the pre-collision brake control) can be kept even after the stop thereof. However, in, for example, although the pre-collision brake control is configured as a control mode for outputting the maximum requested brake force that can be output from the start of the control, there is also considered a control mode configured such that the requested brake force is suppressed to a value a little smaller than the maximum value before collision and is increased to the maximum value after collision. Further, in a case that the pressurizer 70 is stopped and in a case that the pressurizer 70 is operated, output responsiveness of the pressurized brake fluid pressure by the pressurizer 70 is better in case that the pressurizer 70 is operated than the case the pressurizer 70 is stopped.

Thus, when the pressurized brake fluid pressure has been supplied to the fluid pressure channel by the pressurizer 70, the brake control device of the modification reduces the pressurizing amount of the brake fluid pressure supplied from the pressurizer 70 to the fluid pressure channel by reducing the output torque of the pump motor 74 being driven before the driver's own vehicle collides in the state that the possibility of collision of the driver's own vehicle has been detected (when it has been detected that the driver's own vehicle has a possibility of collision and that avoidance of the collision thereof is impossible) or if the collision of the driver's own vehicle has been detected (more preferably, at the time of detecting the collision of the driver's own vehicle). With the operation, the brake control device of the modification can realize an early determination of the presence or absence of abnormality by the abnormality detecting unit and when the requested brake force is increased or decreased, the brake controller can output the requested brake force after the increase or the decrease thereof with good responsiveness by adjusting the output torque of the pump motor 74 regardless the presence or absence of abnormality.

When, for example, a distance until the driver's own vehicle stops is shorter, it is preferable to more increase a degree of decrease of the pressurizing amount of the brake fluid pressure (a decrease amount of the pressurized brake fluid pressure). This is because since a case that the distance until the driver's own vehicle stops is long is such a case that a vehicle speed of the driver's own vehicle is high and a large brake force is necessary to stop the driver's own vehicle. In contrast, this is because since a case that the distance until the driver's own vehicle stops is short is such a case that the vehicle speed of the vehicle is low and thus even if a brake force for stopping the own vehicle is somewhat small, a large difference is not generated in the distance until the vehicle stops.

When the brake control device of the modification gives priority to the early determination of the presence or absence of abnormality by the abnormality detecting unit, it is sufficient for the controller to reduce the pressurizing amount of the brake fluid pressure by the pressurizer 70 to 0 likewise the embodiment or the first modification. Specifically, when the pressurized brake fluid pressure has been supplied to the fluid pressure channel by the pressurizer 70, the brake control device of the modification reduces the pressurizing amount of the brake fluid pressure supplied from the pressurizer 70 to the fluid pressure channel or sets the pressurizing amount to 0 before the driver's own vehicle collides in the state that the possibility of collision of the driver's own vehicle has been detected (when it has been detected that the driver's own vehicle has a possibility of collision and that avoidance of the collision thereof is impossible) or if the collision of the driver's own vehicle has been detected (more preferably, at the time of detecting the collision of the driver's own vehicle).

Third Modification

When the pressurized brake fluid pressure has been supplied to the fluid pressure channel by the pressurizer 70, the brake control device of the embodiment and the first and second modifications reduce the output torque of the pump motor 74 being driven or set the output torque to 0 before the driver's own vehicle collides in the state that the possibility of collision of the driver's own vehicle has been detected or when the collision of the driver's own vehicle has been detected, thereby prompting to reduce the brake fluid pressure of the fluid pressure channel to which abnormality has occurred due to collision at an early stage. In contrast, when the pressurized brake fluid pressure has been supplied to the fluid pressure channel by the pressurizer 70, the brake control device of the modification reduces the pressurizing amount of the brake fluid pressure supplied to the fluid pressure channel downstream side of a valve mechanism interposed between the pressurizer 70 and the brake force generator 30 of each wheel by controlling the valve mechanism to a valve closing side before the driver's own vehicle collides in the state that the possibility of collision of the driver's own vehicle has been detected (when it has been detected that the driver's own vehicle has a possibility of collision and that avoidance of the collision thereof is impossible) or if the collision of the driver's own vehicle has been detected (more preferably, at the time of detecting the collision of the driver's own vehicle has been detected), thereby prompting to reduce the brake fluid pressure of the fluid pressure channel to which abnormality has occurred due to collision at an early stage. Here, the pressurizing amount of the brake fluid pressure supplied to the fluid pressure channel downstream side of the valve mechanism is reduced by reducing a valve open amount of the valve mechanism or a supply of the brake fluid to the fluid pressure channel downstream side of the valve mechanism is cut off by closing the valve mechanism and sets the pressurizing amount of the brake fluid pressure supplied to the fluid pressure channel downstream side of the valve mechanism to 0.

In the exemplified brake system, the holding valve **51\*\* and the reducing valve 52\*\*** of each wheel\*\* are interposed between the pressurizer 70 and the brake force generator **30\*\*** of each wheel\*\* as the valve mechanism. The brake system reduces the pressurizing amount of the brake fluid pressure supplied to the fluid pressure channel downstream side of the valve mechanism or sets the pressurizing amount to 0 by controlling the holding valves **51\*\* and the reducing valves 52\*\*** of all the wheels\*\* to a valve closing side or closing the valves of all the wheels\*\*. Here, closing the holding valves **51\*\* and the reducing valves 52\*\*** of all the wheels\*\* and shifting to the holding mode described above cuts the supply of the brake fluid to the fluid pressure path **31\*\* downstream side of the holding valve 51\*\* and suppresses a flow of the brake fluid from the fluid pressure path 31\*\*** (except a leakage of the brake fluid due to a damage).

Arithmetic processings of the brake control device of the modification will be explained based on flowcharts of FIG. 4, FIG. 7, and FIG. 8. Since arithmetic processing illustrated in the flowchart of FIG. 4 is carried out as the same processing as that of the embodiment except that the specific contents of the arithmetic processing step ST9 is different, an explanation is omitted here.

Figure 7:
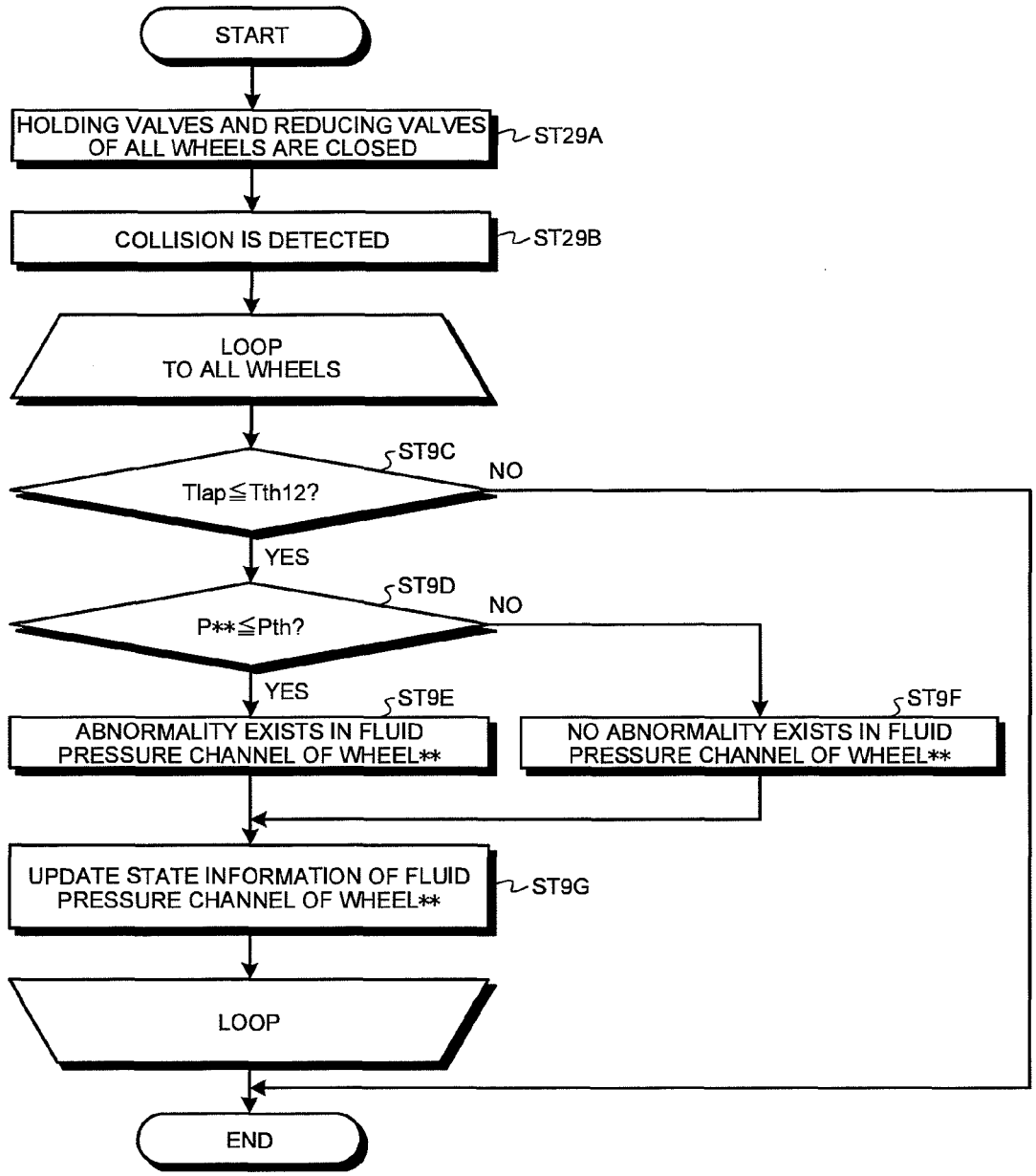
FIG. 7 is a flowchart explaining an abnormality detection control of the third modification.
Figure 8:
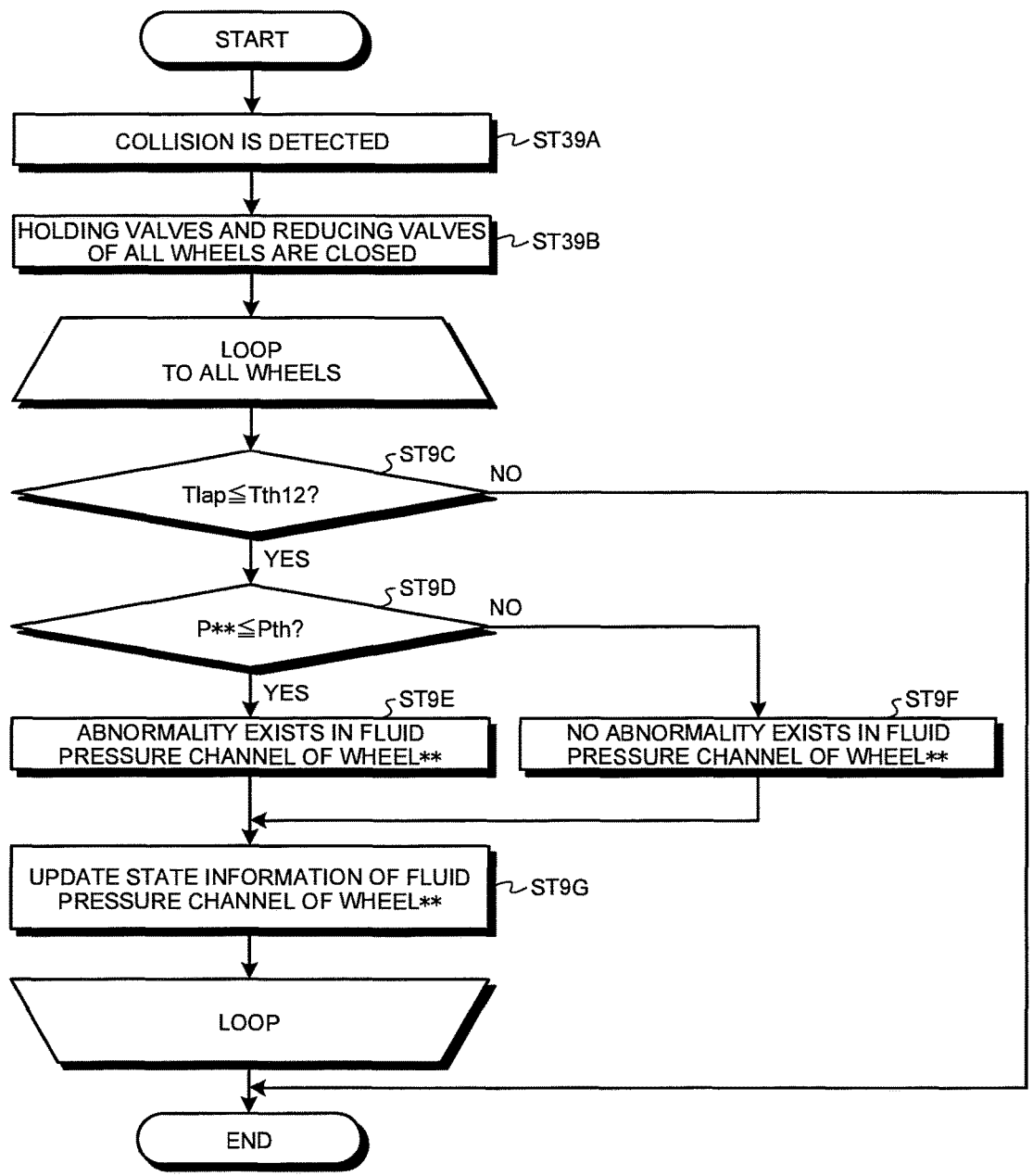
FIG. 8 is a flowchart explaining an abnormality detection control of the third modification.

The valve mechanism interposed between the pressurizer 70 and the brake force generator **30\*\*** of each wheel\*\* (the holding valves **51\*\* and the reducing valves 52\*\*** of all the wheels\*\*) is closed at different timing in the flowcharts of FIG. 7 and FIG. 8. In the flowchart of FIG. 7, the valve mechanism is closed before the driver's own vehicle collides (when it has been detected that the driver's own vehicle has a possibility of collision and that avoidance of the collision thereof is impossible). In contrast, in the flowchart of FIG. 8, the valve mechanism is closed when the collision of the driver's own vehicle has been detected. In the arithmetic processings illustrated in the flowcharts of FIG. 7 and of FIG. 8, the arithmetic processing steps after step ST9C are the same as the arithmetic processing steps after step ST9C of the embodiment described above. An explanation after step ST9C will be also omitted here.

A case that the valve mechanism is closed before the collision of the driver's own vehicle (the flowchart of FIG. 7) will be explained.

When the predicted time Ttc until collision is equal to or smaller than the predetermined time Tth11, the brake controller closes the holding valves **51\*\* and the reducing valves 52\*\*** of all the wheels\*\* (step ST29A).

In the exemplification, since the pre-collision brake control is carried out, the master cut valves 41A, 41B are closed. Further, while the pre-collision brake control is carried out, the suction valves 44A, 44B are also closed. For this reason, when the holding valves **51\*\*** of all the wheels\*\* are closed, the brake fluid pressure pressurized by the pressurizer 70 loses its destination. To cope with the problem, although it is thought to escape the brake fluid pressure pressurized by the pressurizer 70 by opening the suction valves 44A, 44B, this operation is useless with only an increase in a power consumption amount. When the valve mechanism (the holding valves **51\*\* and the reducing valves 52\*\*** of all the wheels\*\*) interposed between the pressurizer 70 and the brake force generator **30\*\*** of each wheel\*\* is closed, the brake controller stops the pressurizer 70 by stopping the pump motor 74 being driven.

When the collision of the driver's own vehicle is detected in the state (step ST29B), the abnormality detecting unit carry out the arithmetic processing steps after step ST9C to each wheel\*\*.

In contrast, when a valve closing operation is carried out at the time the collision of the driver's own vehicle is detected (the flowchart of FIG. 8), the brake controller closes the holding valves **51\*\* and the reducing valves 52\*\*** of all the wheels\*\* (step ST39B) when it is determined that the predicted time Ttc until collision is equal to or smaller than the predetermined time Tth11 and the collision of the driver's own vehicle is detected by the collision determining unit thereafter (step ST39A). When the valve closing operation is carried out, the pressurizer 70 is stopped by stopping the pump motor 74 being driven likewise the exemplification of FIG. 7. After the valve closing operation has been carried out, the abnormality detecting unit carry out the arithmetic processing steps after step ST9C to each wheel\*\*.

Also in the modification, even if the abnormality detecting unit has carried out the arithmetic processing steps after step ST9C to all the wheels\*\*, it is preferable to cause the abnormality detecting unit to repeat the arithmetic processing steps after step ST9C again to each wheel\*\* until the negative determination (Tlap>Tth12) is satisfied at step ST9C.

Also in any of the exemplifications of FIG. 7 and of FIG. 8, the abnormality detecting unit can find the presence or absence of abnormality in the fluid pressure channel downstream side of the pressurizer 70 by carrying out the arithmetic processing steps after step ST9C to all the wheels\*\*. However, since the brake fluid pressure of the pump paths 72A, 72B is not apparent to the abnormality detecting unit, the detecting unit cannot determine the presence or absence of abnormality of the pump paths 72A, 72B. To cope with the problem, in the modification, the presence or absence of abnormality of the pump paths 72A, 72B may be determined by disposing a fluid pressure sensor to each of the pump paths 72A, 72B and finding a change of the fluid pressure of the pump paths 72A, 72B after collision.

Figure 9:
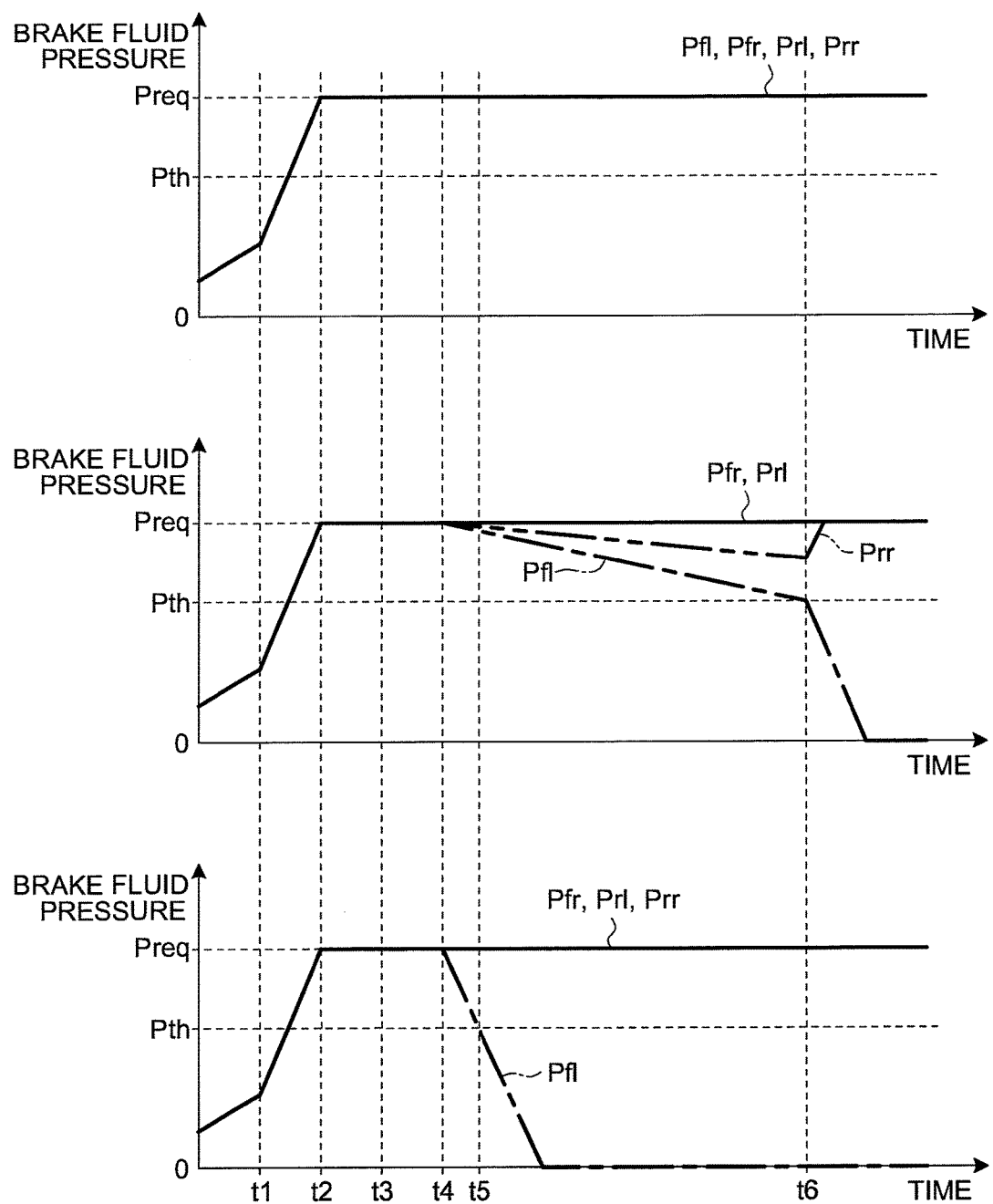
FIG. 9 is a view illustrating states of brake fluid pressures acting on brake force generators of respective wheels as a time passes when holding valves and reducing valves are closed.

A lower view of FIG. 9 is a view when the arithmetic processing of FIG. 7 is carried out and illustrates a state of the brake fluid pressure P\*\* acting on the brake force generator **30\*\*** of each wheel\*\* as a time elapses. The view illustrates a state that the brake fluid leaks only from the fluid pressure channel (the fluid pressure path 31$fl$) of the front left wheel due to collision. Note that an upper view and a middle view of FIG. 9 are the same as the upper view and the middle view of FIG. 3, respectively.

In FIG. 9, it is determined at time t1 that a collision cannot be avoided and the pre-collision brake control is started, and the brake fluid pressure increases to the requested brake fluid pressure Preq of the pre-collision brake control at time t2. In FIG. 9, the holding valves **51\*\* and the reducing valves 52\*\*** of all the wheels\*\* are closed at time t3. Time t4 is a time at which the brake fluid starts to leak due to collision. Times t5, t6 are times at which the brake fluid pressure Pf1 of the front left wheel is reduced to the predetermined pressure Pth and at which the abnormality detecting unit detects the abnormality of the fluid pressure path 31$fl$. Times t5, t6 are further start times of a control for closing the holding valve 51$fl$ and the reducing valve 52$fl$ of the front left wheel.

In the state that the holding valves **51\*\* and the reducing valves 52\*\*** of all the wheels\*\* have been closed, since no new brake fluid is supplied to the fluid pressure path 31$fl$ of the front left wheel, the brake fluid pressure which has reduced to the predetermined pressure Pth, can be detected at timing earlier a time "t6−t5" in advance as compared with a case illustrated in the middle view of FIG. 9 in which none of the holding valves **51\*\* and the reducing valves 52\*\*** of all the wheels\*\* is closed. As a result, the abnormality detecting unit can detect that abnormality has occurred in the fluid pressure channel and can specify the fluid pressure channel to which the abnormality has occurred earlier in comparison with the case that none of the holding valves 51\*\* and the reducing valves 52\*\* of all the wheels\*\* is closed.

The second fluid pressure circuit of the same system exists between the fluid pressure path 31fl of the front left wheel and the fluid pressure path 31rr of the rear right wheel. However, since the holding valves 51rr and the reducing valves 52fl, 52rr of the respective wheels are closed, the fluid pressure path 31fl and the fluid pressure path 31rr are shut off therebetween. Thus, in the brake control device of the modification, this is also a factor for prompting the reduction of the brake fluid pressure of the fluid pressure path 31fl of the front left wheel, which contributes to the early detection of the abnormality of the fluid pressure channel and the early specification of the fluid pressure channel to which abnormality has occurred. Further, even if the valve closing operation causes the brake fluid to start to leak from the fluid pressure path 31fl of the front left wheel due to collision, when the fluid pressure path 31rr of the rear right wheel is normal, the brake fluid pressure Prr of the fluid pressure path 31rr is not reduced by the leakage of the brake fluid of the fluid pressure path 31fl. Thus, in the brake control device of the modification, after the abnormality detecting unit has determined the presence or absence of abnormality of the fluid pressure path 31\*\* of all the wheels\*\*, a control for compensating the reduction of the brake fluid pressure Prr of the rear right wheel as in the embodiment becomes unnecessary.

As described above, the brake control device of the modification can achieve the early detection of abnormality of the fluid pressure channel and the early specification of the fluid pressure channel to which abnormality has occurred. Even when a fluid pressure path 31\*\* to which abnormality has occurred and a fluid pressure path 31\*\* to which no abnormality has occurred are mixed in a fluid pressure circuit of the same system, the brake control device does not reduce the brake fluid pressure of a normal fluid pressure path 31\*\* by the control of the valve mechanism (the holding valves 51\*\* and the reducing valves 52\*\* of all the wheels\*\*) interposed between the pressurizer 70 and the brake force generator 30\*\* of each wheel\*\* to the valve closing side in comparison with the embodiment for only closing the pressurizer 70. As a result, since the brake control device need not to compensate the reduction of the brake fluid pressure, an increase in the power consumption amount caused by driving the pump motor 74 can be suppressed.

Just after the valve mechanism (the holding valves 51\*\* and the reducing valves 52\*\* of all the wheels\*\*) interposed between the pressurizer 70 and the brake force generator 30\*\* of each wheel\*\* has been closed, the pressurized brake fluid pressure before the valve mechanism is closed remains in the fluid pressure path 31\*\* of each wheel\*\*. Thus, the pressurized brake fluid pressure is approximately kept thereafter in the normal fluid pressure path 31\*\* from which no brake fluid leaks. As a result, even after the valve closing control has been carried out, the requested brake force in the pre-collision brake control being continued can be approximately kept.

Further, since the brake control device prompts the early reduction of the brake fluid pressure of a fluid pressure channel to which abnormality has occurred, a variation (an inclination of reduction) the brake fluid pressure is large, which makes it easy to predict a leakage speed of the brake fluid and a remaining brake fluid pressure in comparison with the case that the valve mechanism (the holding valves 51\*\* and the reducing valves 52\*\* of all the wheels\*\*) interposed between the pressurizer 70 and the brake force generator 30\*\* of each wheel\*\* is not controlled to the valve closing side. Thus, the brake control device can improve the controllability of the maneuvering stabilization control.

Fourth Modification

Figure 2:
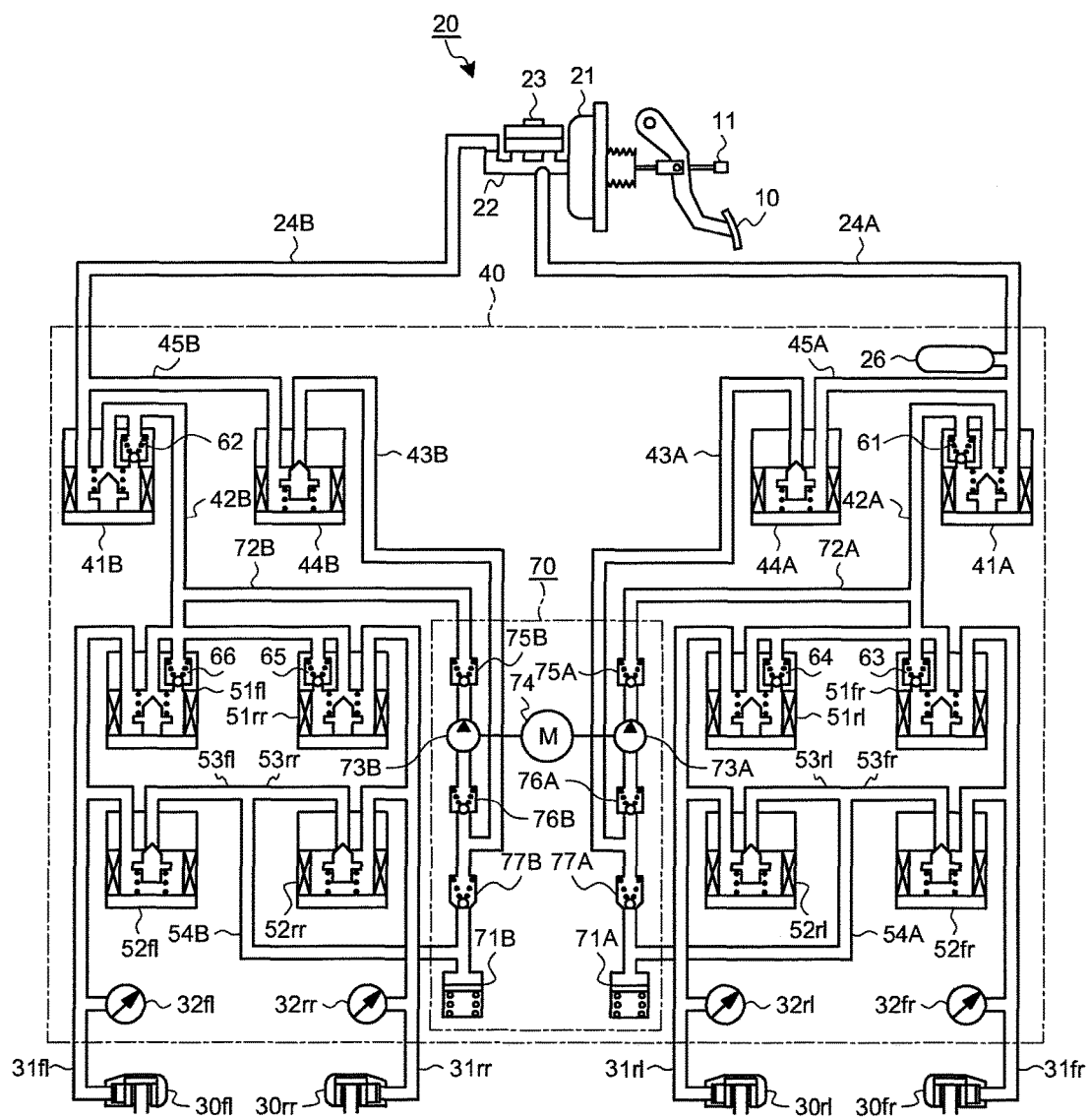
FIG. 2 is a view illustrating a configuration of a brake system of an embodiment and first to third modifications.

Although the brake control devices of the embodiment and the first to third modifications described above has been explained using the brake system of FIG. 2 as a control target which is mounted on the vehicle provided with the engine as the power source, a brake system of a hybrid vehicle using an engine and a rotary machine (motor, etc.) as power sources can be also used as the control target.

Figure 10:
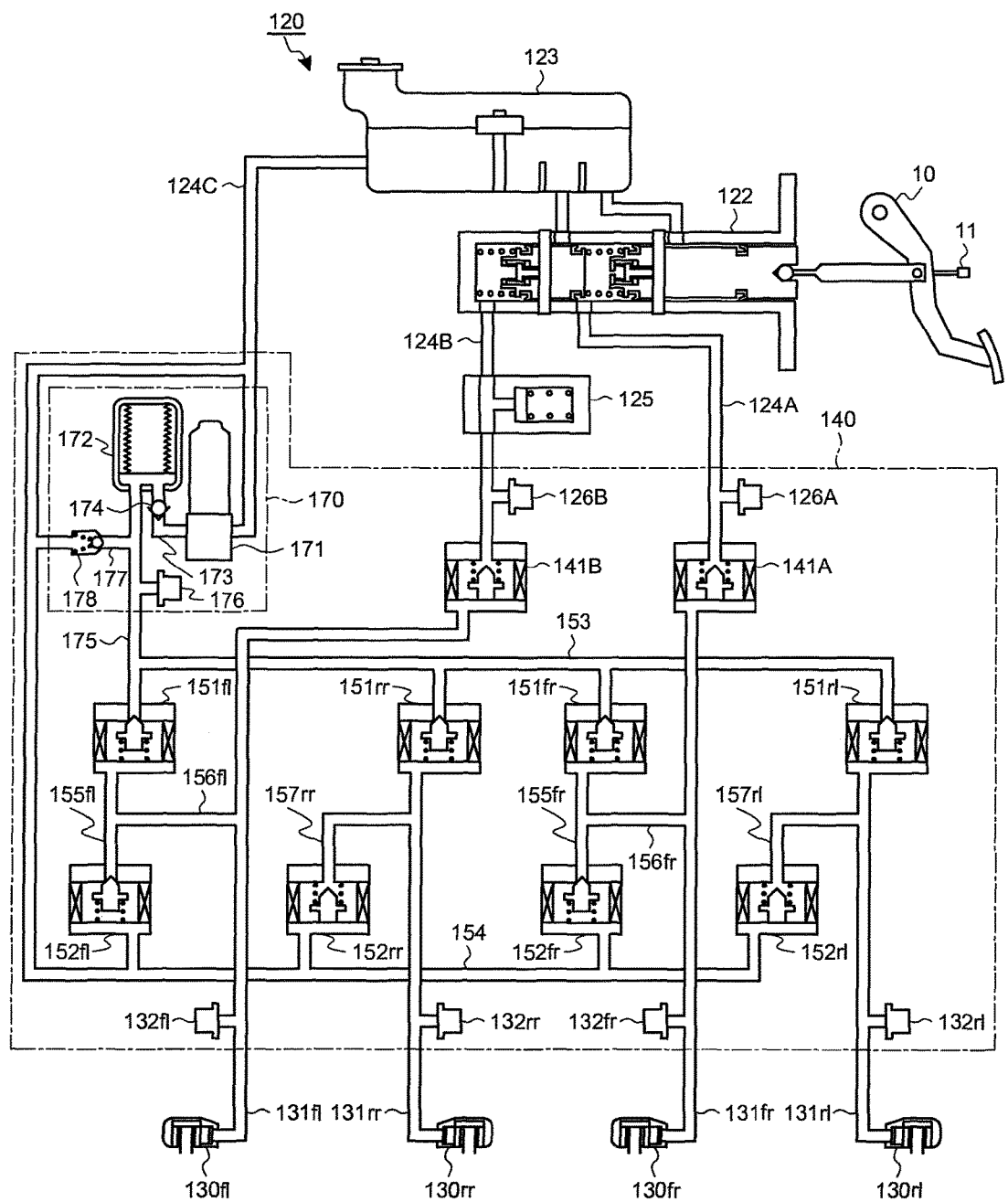
FIG. 10 is a view illustrating a specific configuration of a brake system of a fourth modification.

Likewise the brake system of FIG. 2, the brake system of the modification is a disk brake device and can individually apply a brake force according to a master cylinder pressure or to a brake fluid pressure having been adjusted to respective wheels\*\*. Likewise the brake system of FIG. 2, the brake system includes a fluid pressure generator 120, a brake force generator 130\*\* of each wheel\*\*, and a fluid pressure adjuster 140 (FIG. 10).

The fluid pressure generator 120 includes a master cylinder 122 and a reservoir tank 123. The master cylinder 122 causes a first fluid pressure path 124A to communicate with a fluid pressure chamber on one hand and causes a second fluid pressure path 124B to communicate with a fluid pressure chamber on the other hand. The reservoir tank 123 is connected with a third fluid pressure path 124C.

A stroke simulator device 125 is disposed on the second fluid pressure path 124B. The stroke simulator device 125 includes a stroke simulator and a simulator control valve. The simulator control valve is a so-called normally-close electromagnetic valve and a valve opening degree can be changed under the control of a brake controller of a brake ECU 1. The brake ECU 1 opens the simulator control valve by applying a current of a predetermined current value to a solenoid and feeds a brake fluid from the second fluid pressure path 124B to the stroke simulator.

The first fluid pressure path 124A and the second fluid pressure path 124B are connected with master cylinder pressure sensors 126A, 126B, respectively. The master cylinder pressure sensor 126B is disposed downstream side of the stroke simulator device 125 on the second fluid pressure path 124B. Output signals of the master cylinder pressure sensors 126A, 126B are sent to the brake ECU 1.

The fluid pressure adjuster 140 is a brake actuator controlled by the brake controller and supplies the master cylinder pressure or the brake fluid pressure having been adjusted to the brake force generator 130\*\* as a supply target via the fluid pressure path 131\*\*. A fluid pressure sensor 132\*\* is disposed to each wheel\*\* on the fluid pressure path 131\*\*. The fluid pressure sensor 132\*\* detects the brake fluid pressure supplied to the brake force generator 130\*\* and sends its detection signal to the brake ECU 1.

The fluid pressure adjuster 140 includes two selector valves 141A, 141B. The selector valves 141A, 141B are a so-called normally-open electromagnetic valve and can change a valve opening degree under the control of the brake controller. The selector valve 141A connects the first fluid pressure path 124A to a fluid pressure path 131fr of a front right wheel and communicates therebetween when it opens. The selector valve 141B connects the second fluid pressure path 124B to a fluid pressure path 31fl of a front left wheel and communicates therebetween when it opens.

Respective wheels include holding valves 151 and reducing valves 152. All the holding valves 151 and reducing valves 152*fl*, 152*fr* of front wheels are a so-called normally-close electromagnetic valve and can change a valve opening degree thereof under the control of the brake controller. In contrast, reducing valves 152*rl*, 152*rr* of rear wheels are a so-called normally-open electromagnetic valve and a valve opening degree thereof can be changed under the control of the brake controller.

A fluid pressure path 153 is connected to an upstream side of all the holding valves 151. A fluid pressure path 154 is connected to a downstream side of all the reducing valves 152. The fluid pressure path 154 is connected to a third fluid pressure path 124C.

One ends of fluid pressure paths 155*fl*, 155*fr* are connected to downstream sides of holding valves 155*fl*, 151*fr* of the front wheels, respectively. The other ends of the fluid pressure paths 155*fl*, 155*fr* are connected to upstream sides of reducing valves 152*fl*, 152*fr* of the front wheels, respectively. In contrast, the fluid pressure paths 155*fl*, 155*fr* are connected to fluid pressure paths 131*fl*, 131*fr* via fluid pressure paths 156*fl*, 156*fr*, respectively.

In contrast, fluid pressure paths 131*fl*, 131*rr* are connected to downstream sides of holding valves 151*rl*, 151*rr* of the rear wheels, respectively. In the rear wheels, the fluid pressure paths 131*rl*, 131*rr* are connected to upstream sides of the reducing valves 152*rl*, 152*rr* via fluid pressure paths 157*rl*, 157*rr*, respectively.

The fluid pressure adjuster 140 includes a pressurizer 170 for pressurizing the brake fluid under the control of the brake controller and supplying the pressurized brake fluid pressure to the fluid pressure path 153 (i.e. to the upstream sides of the holding valves 151**).

The pressurizer 170 includes a pump motor 171 and an accumulator 172. The pump motor 171 is connected with the third fluid pressure path 124C and the brake fluid from the reservoir tank 123 or the fluid pressure path 154 is sucked into the pump motor 171. The pump motor 171 pressurizes the sucked brake fluid and sends the brake fluid to the accumulator 172 via a fluid pressure path 173. The fluid pressure path 173 is disposed with a check valve 174 to prevent the brake fluid in the accumulator 172 from backflowing to the pump motor 171.

The pressurized brake fluid pressure (an accumulator pressure) of the accumulator 172 is supplied to the fluid pressure path 153 (the upstream sides of the holding valves 151) via a fluid pressure path 175. The fluid pressure path 175 is disposed with an accumulator pressure sensor 176. The accumulator pressure sensor 176 detects accumulator pressure supplied to the fluid pressure path 153 (to the upstream side of the holding valves 151) and sends a detection signal thereof to the brake ECU 1.

A fluid pressure path 177 is connected between the accumulator 172 and the accumulator pressure sensor 176 in the fluid pressure path 175. The fluid pressure path 177 is further connected to the fluid pressure path 154. The fluid pressure path 177 is disposed with a check valve 178 capable of causing the brake fluid to flow from the fluid pressure path 175 only to the fluid pressure path 154.

A control carried out to the brake system by the brake controller will be explained.

When a control target wheel in a pressure increase mode exists, the brake controller opens the holding valve 151 of the control target wheel, closes the reducing valve 152 of the control target wheel, and drives and controls the pump motor 171. When a control target wheel in a pressure reduction mode exists, the brake controller closes the holding valve 151 of the control target wheel and opens the reducing valve 152 of the control target wheel. Further, when a control target wheel in a holding mode exists, the brake controller closes the holding valve 151 and the reducing valve 152 of the control target wheel.

When the brake assist control and the pre-collision brake control are carried out, the brake controller closes the selector valves 141A, 141B, opens the holding valves 151 of all the wheels, closes the reducing valves 152 of all the wheels, and drives and controls the pump motor 171.

When the pressurized brake fluid pressure is supplied to the fluid pressure channel by the pressurizer 170, the brake control device of the modification reduces the pressurizing amount of the brake fluid pressure supplied from the pressurizer 170 to the fluid pressure channel or sets the pressurizing amount to 0 by reducing output torque of the pump motor 171 being driven or setting the output torque to 0 before the driver's own vehicle collides in the state that the possibility of collision of the driver's own vehicle has been detected (when it has been detected that the driver's own vehicle has a possibility of collision and that avoidance of the collision thereof is impossible) or if the collision of the driver's own vehicle has been detected (more preferably, at the time of detecting the collision of the driver's own vehicle), thereby prompting to reduce the brake fluid pressure of the fluid pressure channel to which abnormality has occurred due to collision at an early stage. With the operation, the brake control device can obtain the same effect as the brake control devices of the embodiment and the first and second modifications.

Further, when the pressurized brake fluid pressure (an accumulator pressure) is supplied to the fluid pressure channel by the pressurizer 170, the brake control device of the modification reduces the pressurizing amount of the brake fluid pressure supplied to the fluid pressure channel downstream side of a valve mechanism (the holding valves 51 and the reducing valves 152 of all the wheels) interposed between the pressurizer 170 and the brake force generator 130 of the respective wheels or sets the pressurizing amount to 0 by controlling the valve mechanism to a valve closing side or closing the valve mechanism before the driver's own vehicle collides in the state that the possibility of collision of the driver's own vehicle has been detected (when it has been detected that the driver's own vehicle has a possibility of collision and that avoiding the collision thereof is impossible) or if the collision of the driver's own vehicle has been detected (more preferably, at the time of detecting the collision of the driver's own vehicle), thereby making it possible to also prompt to reduce the brake fluid pressure of the fluid pressure channel to which abnormality has occurred due to collision at an early stage. In the valve close control it is preferable to stop the pump motor 171 being driven. With the operation, the brake control device can obtain the same effect as the brake control device of the third modification. Note that the reducing valves 152 of all the wheels may be closed together with the holding valves 151.

The brake system of the modification is an example of a configuration of the brake system illustrated in FIG. 1 which is roughly classified into an input unit 210 and a pressurizer 270.

When applied to an example of FIG. 10, the input unit 210 is a configuration of a fluid pressure circuit including the master cylinder 122 connected to the brake pedal 10. When the master cylinder pressure is switched to the pressurized brake fluid pressure and transmitted to a brake force generator 230, since a stroke simulator is mounted, the stroke simulator is also included in the input unit 210. In the fluid pressure channel from the input unit 210 to the brake force generator 230** of each wheel, a valve mechanism (an electromagnetic valve and a machine valve) is disposed to an upstream side or a downstream side of a branch. When applied to the example of FIG. 10, the valve mechanism is the selector valves 141A, 141B, the holding valves 151** and the reducing valves 152****.

When applied to the example of FIG. 10, the pressurizer 270 is a configuration of the fluid pressure circuit including the pressurizer 170. In the fluid pressure channel from the pressurizer 270 to the brake force generator 230 of each wheel, a valve mechanism (an electromagnetic valve and a machine valve) is disposed on an upstream side or downstream side of a branch. When applied to the example of FIG. 10, the valve mechanism is the holding valves 151** and the reducing valves 152****.

Figure 11:
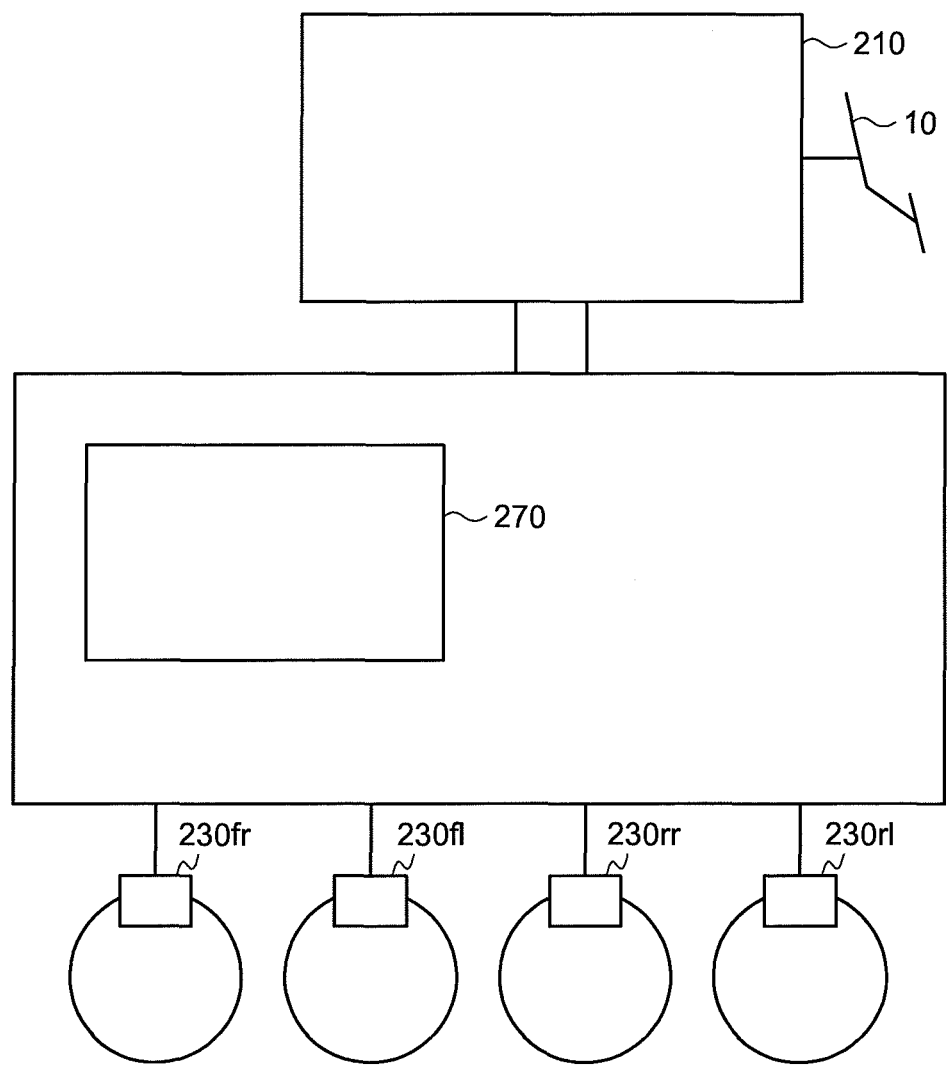
FIG. 11 is a view illustrating a configuration of a brake system of the fourth modification.
Figure 12:
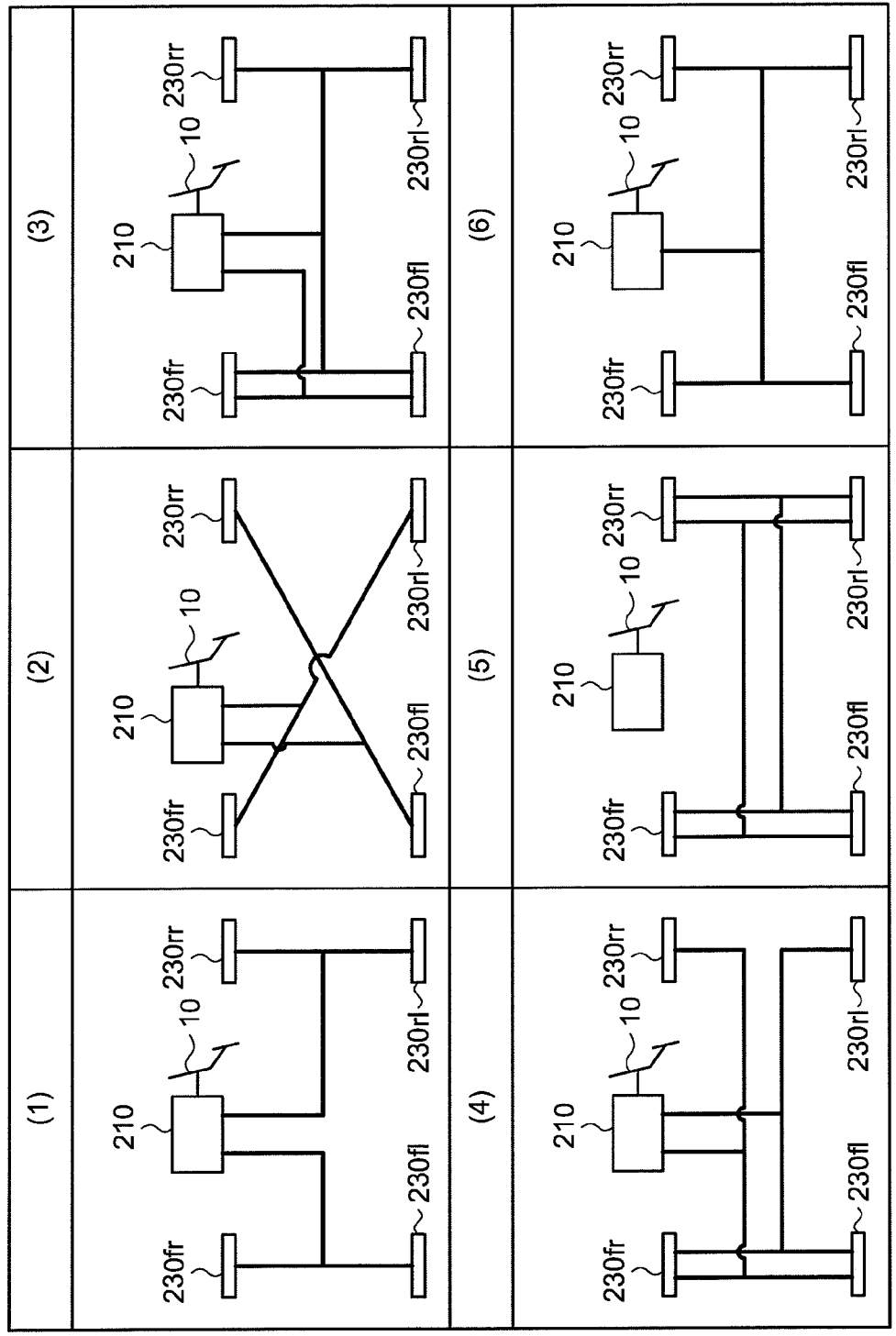
FIG. 12 is a view illustrating a fluid pressure channel between an input unit and a brake force generator.
Figure 13:
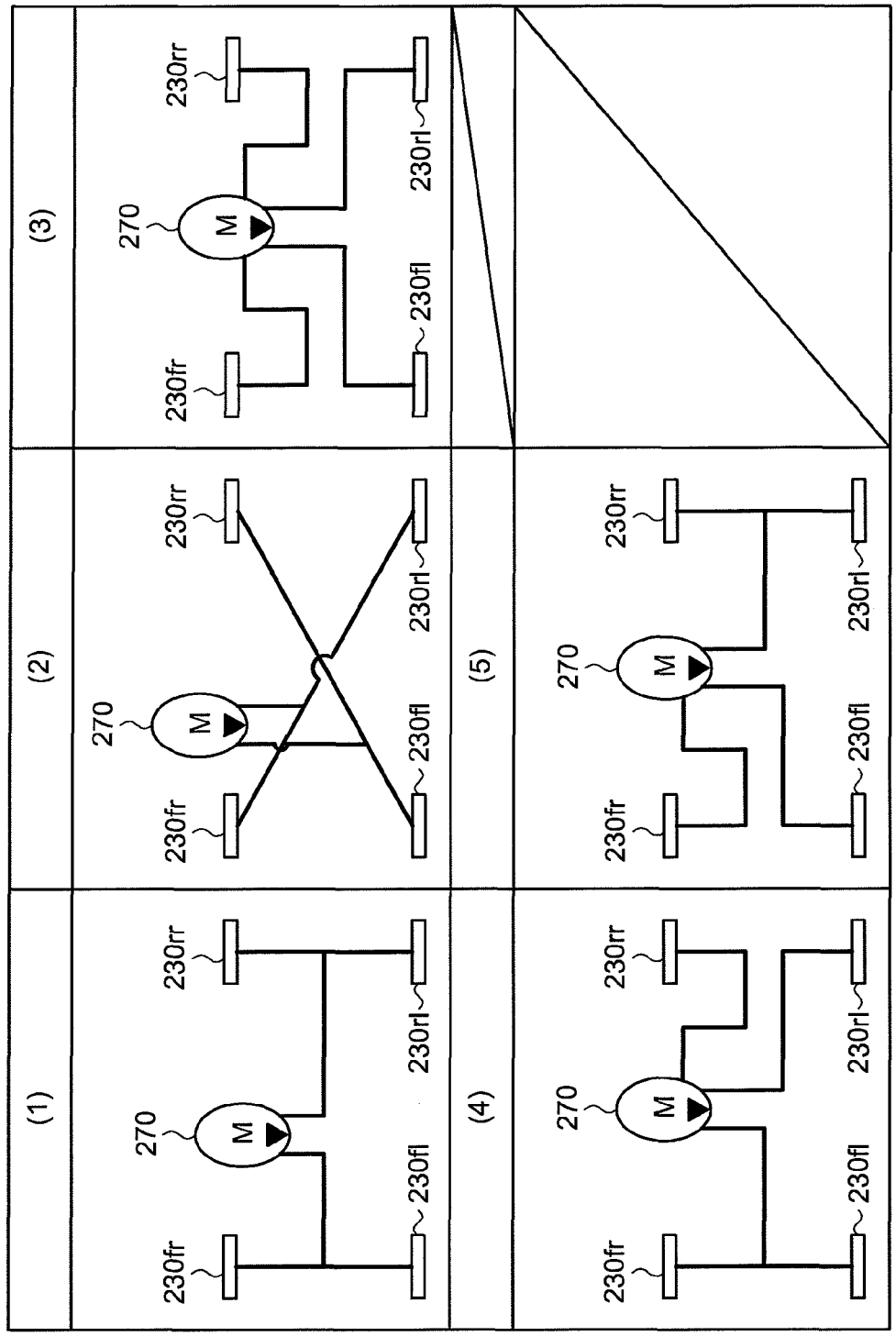
FIG. 13 is a view illustrating a fluid pressure channel between a pressurizer and a brake force generator.
Figure 14:
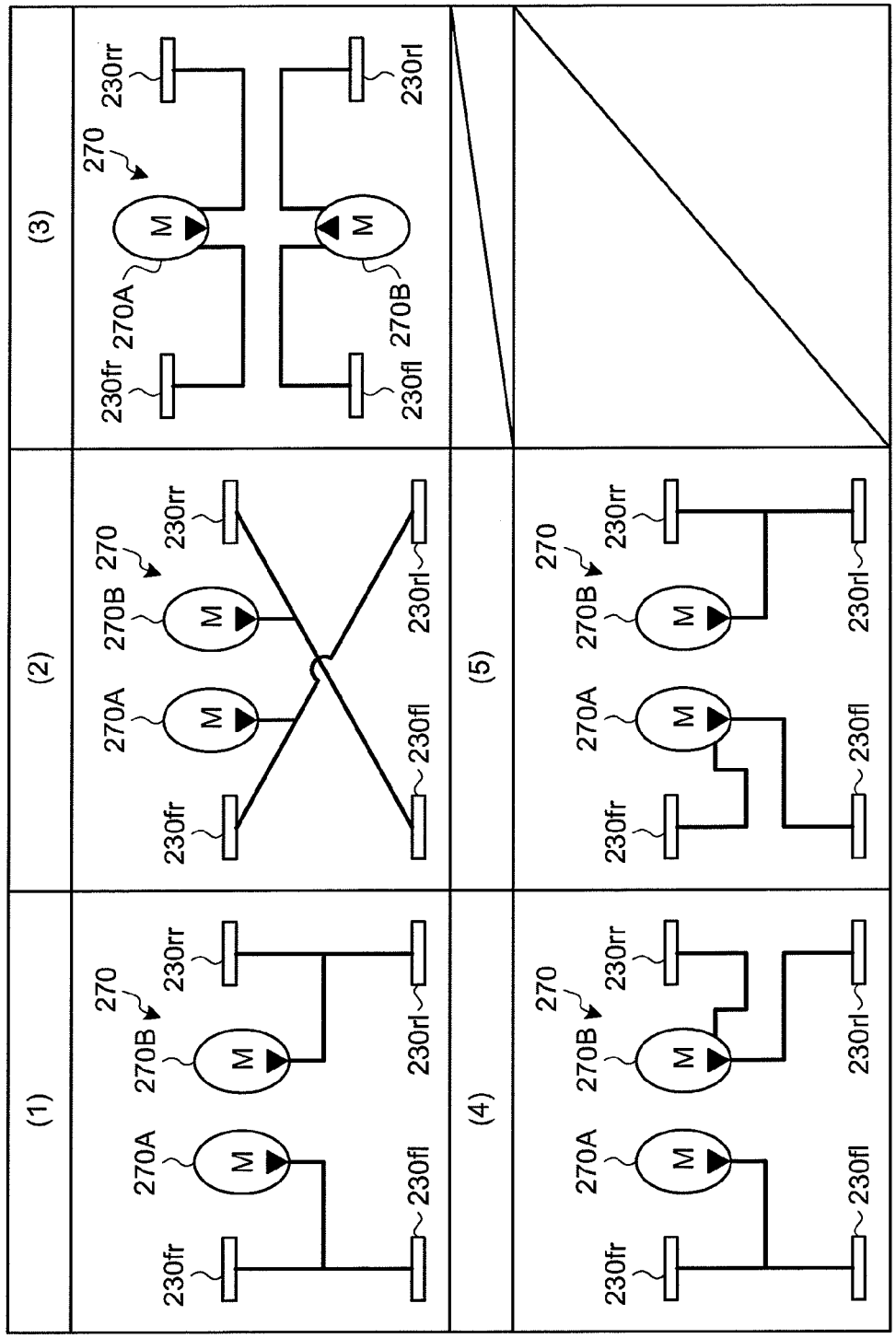
FIG. 14 is a view illustrating a fluid pressure channel between a pressurizer and a brake force generator.

The input unit 210 and the pressurizer 270 in the brake system illustrated in the FIG. 11 is composed of a combination of one of various exemplifications as to the input unit 210 illustrated in FIG. 12 and one of various exemplifications as to the pressurizer 270 illustrated in FIG. 13 or FIG. 14. FIG. 12 exemplifies the fluid pressure channel between the input unit 210 and the brake force generator 230. FIG. 13 and FIG. 14 exemplify the fluid pressure channel between the pressurizer 270 and the brake force generator 230****.

In (1) of FIG. 12, the fluid pressure channel from the input unit 210 is branched to brake force generators 230fl, 230fr of the front wheels and brake force generators 230rl, 230rr of the rear wheels. In (2), the fluid pressure channel from the input unit 210 is branched to the brake force generators 230fl, 230rr of the front left wheel and the rear right wheel and to the brake force generators 230fr, 230rl of the front right wheel and the rear left wheel. In (3), the fluid pressure channel from the input unit 210 is branched to the brake force generators 222d, 230fr of the front wheels and the brake force generator 230 of all the wheels. In (4), the fluid pressure channel from the input unit 210 is branched to the brake force generators 230ll, 230fr, 230rl of the front wheels and the rear left wheel and to the brake force generators 230fl, 230fr, 230rr of the front wheels and the rear right wheel. In (5), what is illustrated is of a so-called brake-by-wire type that has two systems of the fluid pressure channel to the brake force generators 230** of all the wheels. In (6), what is illustrated is configured such that the fluid pressure channel from the input unit 210 is branched to the brake force generators 230**** of all the wheels.

In (1) of FIG. 13, the fluid pressure channel from the pressurizer 270 is branched to the brake force generators 230fl, 230fr of the front wheels and to the brake force generator 230rl, 230rr of the rear wheels. In (2), the fluid pressure channel from the pressurizer 270 is branched to the brake force generators 230fl, 230rr of the front left wheel and the rear right wheel and to the brake force generators 230fr, 230rl of the front right wheel and the rear left wheel. In (3), the fluid pressure channel from the pressurizer 270 is branched to the brake force generators 230 of all the wheels. In (4), the fluid pressure channel from the pressurizer 270 is branched to the brake force generators 230fl, 230fr of the front wheels, the brake force generator 230rl of the rear left wheel, and the brake force generator 230rr of the rear right wheel. In (5), the fluid pressure channel from the pressurizer 270 is branched to the brake force generator 230fl of the front left wheel, the brake force generator 230fr of the front right wheel, and the brake force generators 230rl, 230**rr of the rear wheels.

FIG. 14 illustrates a configuration provided with a first pressurizer 270A and a second pressurizer 270B as the pressurizer 270. (1) illustrates a configuration provided with the fluid pressure channel from the first pressurizer 270A to the brake force generators 230fl, 230fr of the front wheels and the fluid pressure channel from the second pressurizer 270B to the brake force generator 230rl, 230rr of the rear wheels. (2) illustrates a configuration provided with the fluid pressure channel from the first pressurizer 270A to the brake force generators 230fr, 230rl of the front right wheel and the rear left wheel and the fluid pressure channel from the second pressurizer 270B to the brake force generators 230fl, 230rr of the front left wheel and the rear right wheel. (3) illustrates a configuration provided with the fluid pressure channel from the first pressurizer 270A to the brake force generator 230fr of the front right wheel and the brake force generator 230rr of the rear right wheel and the fluid pressure channel from the second pressurizer 270B to the brake force generator 230fl of the front left wheel and the brake force generator 230rl of the rear left wheel. (4) illustrates a configuration provided with the fluid pressure channel from the first pressurizer 270A to the brake force generators 230fl, 230fr of the front wheels, the fluid pressure channel from the second pressurizer 270B to the brake force generator 230rl of the rear left wheel, and the fluid pressure channel from the second pressurizer 270B to the brake force generator 230rr of the rear right wheel. (5) illustrates a configuration provided with the fluid pressure channel from the first pressurizer 270A to the brake force generator 230fl of the front left wheel, the fluid pressure channel from the first pressurizer 270A to the brake force generator 230fr of the front right wheel, and the fluid pressure channel from the second pressurizer 270B to the brake force generators 230rl, 230rr of the rear wheels.

Also in the brake systems composed of the various combinations illustrated in FIG. 11, the brake control device of the modification can obtain the same effect by carrying out the same control as those explained previously.

REFERENCE SIGNS LIST 1 brake ECU
20 fluid pressure generator
22 master cylinder
24A first fluid pressure path
24B second fluid pressure path
30fl, 30fr, 30rl, 30rr brake force generator
31fl, 31fr, 31rl, 31rr fluid pressure path
32fl, 32fr, 32rl, 32rr fluid pressure sensor
40 fluid pressure adjuster
41A, 41B master cut valve
51fl, 51fr, 51rl, 51rr holding valve
52fl, 52fr, 52rl, 52rr reducing valve
53fl, 53fr, 53rl, 53rr, 54A, 54B fluid pressure path
70 pressurizer
71A, 71B auxiliary reservoir
72A, 72B pump path
73A, 73B pressurizing pump
74 pump motor
94 drive support ECU
120 fluid pressure generator
122 master cylinder
124A first fluid pressure path
124B second fluid pressure path
130fl, 130fr, 130rl, 130rr brake force generator
131fl, 131fr, 131rl, 131rr fluid pressure path
132fl, 132fr, 132rl, 132rr fluid pressure sensor 140 fluid pressure adjuster
141A, 141B selector valve
151*fl*, 151*fr*, 151*rl*, 151*rr* holding valve
152*fl*, 152*fr*, 152*rl*, 152*rr* reducing valve
153, 154, 155*fl*, 155*fr*, 156*fl*, 156*fr*, 157*rl*, 157*rr* fluid pressure path
170 pressurizer
171 pump motor
172 accumulator
173, 175 fluid pressure path

The invention claimed is:

1. A brake control device comprising:
a brake force generator of each wheel configured to generate a brake force according to a brake fluid pressure supplied from a fluid pressure channel;
a pressurizer configured to pressurize a brake fluid and send the pressurized brake fluid to the fluid pressure channel;
a collision possibility determining unit configured to determine a possibility of collision of an own vehicle;
a collision determining unit configured to detect the collision of the own vehicle;
an abnormality detecting unit configured to detect abnormality of the fluid pressure channel at the time the brake fluid pressure of the fluid pressure channel has become equal to or smaller than a threshold value; and
a brake controller configured to reduce a pressurizing amount of the brake fluid pressure supplied to the fluid pressure channel or reduce the pressurizing amount to 0 in a state where the possibility of collision of the own vehicle has been detected or after the collision, when the pressurizer has pressurized the brake fluid by the detection of the possibility of the collision and the pressurized brake fluid pressure has been supplied to the fluid pressure channel.

2. The brake control device according to claim 1, wherein the brake controller starts a reduction control of the pressurizing amount of the brake fluid pressure, which is carried out before the collision of the own vehicle in the state where the possibility of collision of the own vehicle has been detected, at the time the collision possibility determining unit has determined that avoidance of the collision of the own vehicle is impossible.

3. The brake control device according to claim 1, wherein the brake controller starts the reduction control of the pressurizing amount of the brake fluid pressure, which is carried out after the collision of the own vehicle, at the time the collision determining unit has detected the collision of the own vehicle.

4. The brake control device according to claim 1, wherein at the time the brake controller carries out the reduction control of the pressurizing amount of the brake fluid pressure, the brake controller controls the pressurizer and reduces the pressurizing amount of the brake fluid pressure in the pressurizer or reduces the pressurizing amount to 0.

5. The brake control device according to claim 1, wherein at the time the brake controller carries out the reduction control of the pressurizing amount of the brake fluid pressure, the brake controller controls a valve mechanism interposed between the pressurizer and the brake force generator to a valve closing side or closes the valve mechanism.

6. The brake control device according to claim 5 further comprising:
a holding valve of each wheel for supplying the brake fluid pressure pressurized in the pressurizer at a time of a valve open state to the brake force generator, as the valve mechanism; and
a reducing valve for reducing the brake fluid pressure supplied to the brake force generator at the time of the valve open state, as the valve mechanism,
wherein at the time the brake controller carries out the reduction control of the pressurizing amount of the brake fluid pressure, the brake controller controls the holding valves and the reducing valves of all the wheels to the valve closing side or closes the holding valves and the reducing valves of all the wheels.

7. The brake control device according to claim 1, wherein at the time the brake controller has carried out the reduction control of the pressurizing amount of the brake fluid pressure after the collision of the own vehicle, the brake controller pressurizes the brake fluid pressure of a fluid pressure channel from which no abnormality has detected according to a result of detection of the abnormality detecting unit and causes the brake force generator that connects to the fluid pressure channel to generate a brake force according to the pressurized brake fluid pressure.

8. The brake control device according to claim 2, wherein at the time the brake controller carries out the reduction control of the pressurizing amount of the brake fluid pressure, the brake controller controls the pressurizer and reduces the pressurizing amount of the brake fluid pressure in the pressurizer or reduces the pressurizing amount to 0.

9. The brake control device according to claim 3, wherein at the time the brake controller carries out the reduction control of the pressurizing amount of the brake fluid pressure, the brake controller controls the pressurizer and reduces the pressurizing amount of the brake fluid pressure in the pressurizer or reduces the pressurizing amount to 0.

10. The brake control device according to claim 2, wherein at the time the brake controller carries out the reduction control of the pressurizing amount of the brake fluid pressure, the brake controller controls a valve mechanism interposed between the pressurizer and the brake force generator to a valve closing side or closes the valve mechanism.

11. The brake control device according to claim 3, wherein at the time the brake controller carries out the reduction control of the pressurizing amount of the brake fluid pressure, the brake controller controls a valve mechanism interposed between the pressurizer and the brake force generator to a valve closing side or closes the valve mechanism.

12. The brake control device according to claim 10 further comprising:
a holding valve of each wheel for supplying the brake fluid pressure pressurized in the pressurizer at a time of a valve open state to the brake force generator, as the valve mechanism; and
a reducing valve for reducing the brake fluid pressure supplied to the brake force generator at the time of the valve open state, as the valve mechanism,
wherein at the time the brake controller carries out the reduction control of the pressurizing amount of the brake fluid pressure, the brake controller controls the holding valves and the reducing valves of all the wheels to the valve closing side or closes the holding valves and the reducing valves of all the wheels.

13. The brake control device according to claim 11 further comprising:
a holding valve of each wheel for supplying the brake fluid pressure pressurized in the pressurizer at a time of a valve open state to the brake force generator, as the valve mechanism; and a reducing valve for reducing the brake fluid pressure supplied to the brake force generator at the time of the valve open state, as the valve mechanism, wherein at the time the brake controller carries out the reduction control of the pressurizing amount of the brake fluid pressure, the brake controller controls the holding valves and the reducing valves of all the wheels to the valve closing side or closes the holding valves and the reducing valves of all the wheels.

14. The brake control device according to claim 3, wherein at the time the brake controller has carried out the reduction control of the pressurizing amount of the brake fluid pressure after the collision of the own vehicle, the brake controller pressurizes the brake fluid pressure of a fluid pressure channel from which no abnormality has detected according to a result of detection of the abnormality detecting unit and causes the brake force generator that connects to the fluid pressure channel to generate a brake force according to the pressurized brake fluid pressure.

15. The brake control device according to claim 4, wherein at the time the brake controller has carried out the reduction control of the pressurizing amount of the brake fluid pressure after the collision of the own vehicle, the brake controller pressurizes the brake fluid pressure of a fluid pressure channel from which no abnormality has detected according to a result of detection of the abnormality detecting unit and causes the brake force generator that connects to the fluid pressure channel to generate a brake force according to the pressurized brake fluid pressure.

16. The brake control device according to claim 5, wherein at the time the brake controller has carried out the reduction control of the pressurizing amount of the brake fluid pressure after the collision of the own vehicle, the brake controller pressurizes the brake fluid pressure of a fluid pressure channel from which no abnormality has detected according to a result of detection of the abnormality detecting unit and causes the brake force generator that connects to the fluid pressure channel to generate a brake force according to the pressurized brake fluid pressure.

17. The brake control device according to claim 6, wherein at the time the brake controller has carried out the reduction control of the pressurizing amount of the brake fluid pressure after the collision of the own vehicle, the brake controller pressurizes the brake fluid pressure of a fluid pressure channel from which no abnormality has detected according to a result of detection of the abnormality detecting unit and causes the brake force generator that connects to the fluid pressure channel to generate a brake force according to the pressurized brake fluid pressure.

* * * * *